(12) United States Patent
Kaciulis et al.

(10) Patent No.: US 11,190,491 B1
(45) Date of Patent: Nov. 30, 2021

(54) METHOD AND APPARATUS FOR MAINTAINING A RESILIENT VPN CONNECTION

(71) Applicant: Netflow, UAB, Vilnius (LT)

(72) Inventors: Karolis Kaciulis, Kaisiadorys (LT); Donatas Budvytis, Vilnius (LT)

(73) Assignee: Netflow, UAB, Vilnius (LT)

( * ) Notice: Subject to any disclaimer, the term of this patent is extended or adjusted under 35 U.S.C. 154(b) by 0 days.

(21) Appl. No.: 17/139,903

(22) Filed: Dec. 31, 2020

(51) Int. Cl.
*H04L 29/06* (2006.01)
*G06F 9/54* (2006.01)
*H04N 21/647* (2011.01)

(52) U.S. Cl.
CPC .......... *H04L 63/0272* (2013.01); *G06F 9/547* (2013.01); *H04L 63/029* (2013.01); *H04L 63/0876* (2013.01); *H04N 21/647* (2013.01)

(58) Field of Classification Search
CPC ............... H04L 63/0272; H04L 63/029; H04L 63/0876; G06F 9/547; H04N 21/647
See application file for complete search history.

(56) References Cited

U.S. PATENT DOCUMENTS

| | | | |
|---|---|---|---|
| 8,443,435 B1* | 5/2013 | Schroeder | H04L 63/0272 726/15 |
| 10,374,953 B1* | 8/2019 | Branch | H04L 12/4633 |
| 10,601,779 B1* | 3/2020 | Matthews | H04L 12/4633 |
| 2013/0205025 A1* | 8/2013 | Shamsee | H04L 45/12 709/225 |
| 2017/0099159 A1* | 4/2017 | Abraham | H04L 65/80 |
| 2017/0111250 A1* | 4/2017 | Chan | H04L 12/4641 |

* cited by examiner

*Primary Examiner* — Huan V Doan
(74) *Attorney, Agent, or Firm* — Praveer K Gupta

(57) ABSTRACT

The present embodiment relates to method and system for establishing, by an individual VPN customer or a plurality of VPN customers, a multi-path failure-resistant connectivity to a VPN service while ensuring no unencrypted customer traffic is ever exposed in a public network. The additional aspects of the method and system disclosed is the constant connectivity assessment executed and the automatically triggered recovery mechanism incorporated.

21 Claims, 13 Drawing Sheets

METHOD AND APPARATUS FOR MAINTAINING A RESILIENT VPN CONNECTION

FIELD

The present invention relates to methods for ensuring a resilient and automatically recovering encrypted tunnel connection in the context of multiple point-to-point links between a VPN user and a VPN service provider infrastructure.

BACKGROUND

Resilience to failures and deliberate attacks is becoming an essential requirement in most communication-related services today. This especially applies to VPN services which on the one hand are created on top of communication infrastructures as an overlay construct, as well as the computing infrastructure providing the processing layer, and therefore are equally affected by failures of the underlying infrastructure, but which on the other hand introduce new possibilities like the creation of arbitrary secure links within the overlay.

VPN stands for Virtual Private Network (VPN), a technology that allows a network entity to connect to a private network over a public network. Traditionally the main function of VPN has been to allow for a roaming client, or a distant office connected to a public network, to connect to a private network for accessing the resources within e.g. business applications within a corporate LAN.

VPN technology was developed to allow remote users and branch offices to access corporate applications and resources. To ensure security, the private network connection is established using an encrypted layered tunneling protocol and VPN users use authentication methods, including passwords or certificates, to gain access to the VPN. In other applications, Internet users may secure their connections with a VPN, to circumvent geo-restrictions and censorship, or to connect to proxy servers to protect personal identity and location to stay anonymous on the Internet.

The possible classification of VPNs may be based on the tunneling protocol used, the tunnel's termination point location, e.g. on the client edge or network-provider edge, the topology of connections, such as site-to-site or user remote access, the levels of security provided and others.

As an example of a VPN type by topology Site-to-Site VPN, also called Router-to-Router VPN, is commonly used in large companies. Companies or organizations with branch offices in different locations use Site-to-site VPN to connect the network of one office location to the network at another office location.

Basically, a Site-to-site VPN creates a virtual bridge between the networks at geographically distant offices and connects them through the Internet and sustains secure and private communication between the networks. In Site-to-site VPN one router acts as a VPN Client and another router as a VPN concentrator as it is based on Router-to-Router communication. When the authentication is validated between the two routers only then the communication starts.

Types of Virtual Private Network (VPN) by protocol can be divided into Internet Protocol Security, Layer 2 Tunneling Protocol, Point-to-Point Tunneling Protocol, SSL and TLS or Openvpn.

Internet Protocol Security (IPSec): Internet Protocol Security, known as IPSec, is used to secure Internet communication across an IP network. IPSec secures Internet Protocol communication by verifying the session and encrypts each data packet during the connection. IPSec runs in 2 modes: (i) Transport mode; (ii) Tunneling mode.

The work of transport mode is to encrypt the message in the data packet and the tunneling mode encrypts the whole data packet. IPSec can also be used with other security protocols to improve the security system.

Layer 2 Tunneling Protocol (L2TP) is a tunneling protocol that is often combined with another VPN security protocol like IPSec to establish a highly secure VPN connection. L2TP establishes a tunnel between two L2TP connection points and IPSec protocol encrypts the data and maintains secure communication between the tunnel.

Point-to-Point Tunneling Protocol (PPTP) generates a tunnel and confines the data packet to the tunnel. Point-to-Point Protocol (PPP) may include some levels of authentication and encryption for the data between the connections. PPTP is one of the most widely used VPN protocols and has been in use since the early release of Windows. PPTP is also used on Mac and Linux apart from Windows.

TLS and SSL: Transport Layer Security (TLS), and its now-deprecated predecessor, Secure Sockets Layer (SSL), are cryptographic protocols designed to provide communications security over a computer network. Several versions of the protocols find widespread use in applications such as web browsing, email, instant messaging, and voice over IP (VoIP). Websites can use TLS to secure all communications between their servers and web browsers.

The TLS protocol aims primarily to provide privacy and data integrity between two or more communicating computer applications. When secured by TLS, connections between a client (e.g., a web browser) and a server (e.g., wikipedia.org) should have one or more of the following properties.

The connection is private (or secure) because symmetric cryptography is used to encrypt the data transmitted. The keys for this symmetric encryption are generated uniquely for each connection and are based on a shared secret that was negotiated at the start of the session. The server and client negotiate the details of which encryption algorithm and cryptographic keys to use before the first byte of data is transmitted. The negotiation of a shared secret is both secure (the negotiated secret is unavailable to eavesdroppers and cannot be obtained, even by an attacker who places themselves in the middle of the connection) and reliable (no attacker can modify the communications during the negotiation without being detected).

Users connecting to service through the network, as well as the corresponding protocol sessions, are traced in real time at the service provider's side. Consequently, the activities are registered and logged by local or remote system logging facilities, storing the corresponding logs for a multitude of reasons e.g. incident management, regulation compliance requirements, long-term tendencies analysis and others. The logs traditionally contain enough information to reconstruct the context relevant e.g. for an incident being investigated, to a particular network session, a particular user, a particular authentication session.

Due to the distributed nature of IT platforms underlying contemporary public services, investigating any isolated client session requires scrutiny of logs across multiple infrastructure components. Correlating information from multiple systems for a particular event requires the possibility to link disparate bits and pieces with a primary key element, quite possibly the identification of the client or the platform.

Business to consumer (B2C) VPN service has a strong emphasis on client privacy protection as the primary value the VPN access brings to the users. The client traffic being protected from eavesdropping by any 3rd parties due to accessing the Internet through a VPN tunnel, B2C VPN service security encompasses strong encryption used throughout, elaborate authentication schemes and robust verification flows.

Moreover, client privacy protection is built upon the user's VPN sessions leaving no traces in the system logs at the provider's side, as well as authentication artefacts and instances of authentication flows not linked to VPN sessions, VPN traffic, or encryption artefacts of any particular client.

"Zero knowledge" is the notion B2C VPN service providers position at the core of privacy protection. Essentially the principle signifies the provisioning of the VPN service is feasible while no client activity-linked information is being accumulated or kept at the provider. This is achieved through performing the initial user authentication with the minimally feasible set of user-identity tokens and eliminating what could be construed as the hard link between the user identity within the VPN service infrastructure and network activity within the service, by not recording any VPN user session logs.

Apart from the regular network and authentication activity logs harming/compromising the privacy of the client, some VPN protocols and implementations lack IP management functionality ie. dynamic IP address allocation to a connecting client from a managed IP pool, the IP address reservation, de-allocation of an IP address or its refresh. In some products it may be required to establish a hard-coded one-to-one client link to an IP address, stored locally at the VPN concentrator within configuration files, further compromising the concealment of the user's identity.

The following sections will elaborate and clarify the technology notions the solution employs, is dependent upon or is related to, such as encryption in general, authentication methodologies and attack vectors mitigation.

In cryptography, encryption is the process of encoding a message or information in such a way that only authorized parties can access it and those who are not authorized cannot. Encryption does not itself prevent interference, but denies the intelligible content to a would-be interceptor. In an encryption scheme, the intended information or message, referred to as plaintext, is encrypted using an encryption algorithm—a cipher—generating ciphertext that can be read only if decrypted. For technical reasons, an encryption scheme usually uses a pseudo-random encryption key generated by an algorithm. It is in principle possible to decrypt the message without possessing the key, but, for a well-designed encryption scheme, considerable computational resources and skills are required. An authorized recipient can easily decrypt the message with the key provided by the originator to recipients but not to unauthorized users.

Symmetric and asymmetric cryptographic systems are two major approaches to encryption technique.

Symmetric-key cryptography refers to a cryptographic system that employs the same key for both data encryption and decryption. This means that all participants of the data exchange have to know the same key to be able to securely send the encrypted message and to decrypt the encrypted messages received. Therefore the key is shared among parties, but having to stay secret to 3rd parties—in order to keep communications private—it is considered a shared secret. No adversary can decrypt the message without knowing the secret key.

Public-key cryptography, or asymmetric cryptography, refers to a cryptographic system that uses pairs of keys: public keys which are to be accessible freely, and private keys which are only accessible to the owner. The generation of such keys depends on cryptographic algorithms based on mathematical problems to produce one-way functions. Effective security only requires keeping the private key private; the public key can be openly distributed without compromising security. In such a system, any person can encrypt a message using the receiver's public key, but that encrypted message can only be decrypted with the receiver's private key.

In cryptography, a key-agreement protocol is a protocol whereby two or more parties can agree on a key in such a way that both influence the outcome. If properly done, this precludes undesired third parties from forcing a key choice on the agreeing parties. Protocols that are useful in practice also do not reveal to any eavesdropping party what key has been agreed upon.

Many key exchange systems have one party generate the key, and simply send that key to the other party—the other party has no influence on the key. Using a key-agreement protocol avoids some of the key distribution problems associated with such systems. Protocols where both parties influence the final derived key are the only way to implement perfect forward secrecy.

An example of key agreement protocol may be Elliptic-curve Diffie-Hellman (ECDH), a key agreement protocol that allows two parties, each having an elliptic-curve public-private key pair, to establish a shared secret over an insecure channel. This shared secret may be directly used as a key, or to derive another key. The key, or the derived key, can then be used to encrypt subsequent communications using a symmetric-key cipher. It is a variant of the Diffie-Hellman protocol using elliptic-curve cryptography.

An important part of cryptography is the notion of key derivation, where a key derivation function (KDF) derives one or more secret keys from a secret value such as a master key, a password, or a passphrase using a pseudorandom function. KDFs can be used to stretch keys into longer keys or to obtain keys of a required format, such as converting a group element that is the result of a Diffie-Hellman key exchange into a symmetric key for use with AES. Keyed cryptographic hash functions are popular examples of pseudorandom functions used for key derivation.

A cryptographic hash function is a hash function which takes an input (or 'message') and returns a fixed-size string of bytes. The string is called the 'hash value', 'message digest', 'digital fingerprint', 'digest' or 'checksum'. The ideal hash function has three main properties: 1) It is extremely easy to calculate a hash for any given data. 2) It is extremely computationally difficult to calculate an alphanumeric text that has a given hash. 3) It is extremely unlikely that two slightly different messages will have the same hash.

The identity of the communicating parties can be authenticated using public-key cryptography. This authentication can be made optional but is generally required for at least one of the parties (typically the server).

The connection is reliable because each message transmitted includes a message integrity check using a message authentication code to prevent undetected loss or alteration of the data during transmission.

There are multiple models trying to introduce a classification for the multiple layers and protocols that comprise the computer networks. One of the most established and widely accepted is the Open Systems Interconnection model (OSI model) is a conceptual model that characterizes and standardizes the communication functions of a telecommunication or computing system without regard to its underlying internal structure and technology. Its goal is the interoperability of diverse communication systems with standard communication protocols. The model partitions a communication system into abstraction layers. The original version of the model had seven layers.

A layer serves the layer above it and is served by the layer below it. For example, a layer that provides error-free communications across a network provides the path needed by applications above it, while it calls the next lower layer to send and receive packets that constitute the contents of that path. Two instances at the same layer are visualized as connected by a horizontal connection in that layer.

Layer 4 of the OSI model, the transport layer, is responsible for transferring data across a network and provides error-checking mechanisms and data flow controls. It determines how much data to send, where it gets sent and at what rate. The Transmission Control Protocol is the best known example of the transport layer.

Transmission Control Protocol (TCP) is one of the main protocols of the Internet protocol suite. The protocol provides a communication service at an intermediate level between an application program and the Internet Protocol. It provides host-to-host connectivity at the transport layer of the Internet model. An application does not need to know the particular mechanisms for sending data via a link to another host, such as the required IP fragmentation to accommodate the maximum transmission unit of the transmission medium. At the transport layer, TCP handles all handshaking and transmission details and presents an abstraction of the network connection to the application typically through a network socket interface.

At the lower levels of the protocol stack, due to network congestion, traffic load balancing, or unpredictable network behaviour, IP packets may be lost, duplicated, or delivered out of order. TCP detects these problems, requests retransmission of lost data, rearranges out-of-order data and even helps minimize network congestion to reduce the occurrence of the other problems. If the data still remains undelivered, the source is notified of this failure. Once the TCP receiver has reassembled the sequence of octets originally transmitted, it passes them to the receiving application. Thus, TCP abstracts the application's communication from the underlying networking details.

AAA refers to Authentication, Authorization and Accounting. It is used to refer to a family of protocols that mediate network access. AP, therefore, is an AAA entity in computer networks that provide Internet Protocol (IP) functionality to support the functions of authentication, authorization and accounting.

With increasing functionalities of modern network infrastructures and services, their correct functioning has become essential. Nevertheless, network infrastructures may suffer from random failures and/or become a target of intentional attacks. Therefore, the resilience of network infrastructures and services is becoming an indispensable requirement in most networks these days. In this context, resilience implies the ability of a network to provide and maintain a satisfactory level of service in case of failures and threats. A resilient network must be able to cope with certain levels of failures by remaining completely or partially functional, providing connectivity and capacity to accomplish its task. Threats and failures can range from simple misconfiguration over large scale natural disasters to targeted attacks. In such cases, network resilience can mitigate and recover from threats and failures, thereby making the network infrastructure dependable in the face of challenges.

Different applications have various requirements for network resilience, which may be even contrary to each other. Some applications have high priority towards precise, timely delivery (e.g. video streaming), whereas some applications depend on the completeness of delivery without specific time requirements (e.g. file sharing). So, resilience requirements are contingent to the type of application to be supported. Multiple resilience measures are implemented at various levels of the network infrastructure in order to achieve network resilience. These multiple resilience measures may be categorized broadly into two main groups known as the network-based resilience measures and compute-based resilience measures. Anycast, server clustering, redundancy, round robin DNS are some examples of the resilience measures.

By definition, Anycast is a network addressing and routing methodology in which the same destination address space is visible and reachable via multiple routing paths. When implementing the Anycast method, the routers will choose the required path based on the number of hops, distance, latency measurements or based on the least congested route. Anycast addressing is a one-to one-of-many association where datagrams are routed to any single member of a group of potential receivers that are all identified by the same destination address space. Anycast can be executed through Border Gateway Protocol (BGP), in which multiple hosts (usually in different geographic areas) are given IP addresses from the same IP address space (subnet), and different routes to the address are announced through BGP. Routers consider these to be alternative routes to the same destination, though actually routes to different destinations with the same IP address space. In summary, the main principle of Anycast is that an IP address space (subnet) is advertised or in other words announced in the BGP messages of multiple routers. As this proliferates across the Internet, routers become aware of which of their neighbours provides the shortest and feasible path to the advertised IP address space.

Anycast routing is regarded as one of the efficient ways to provide resilience in a communication network because of its ability to provide automatic failover. Here, the term failover refers to the process of switching to a redundant or standby server, system, or network upon the failure or abnormal cessation of the previously active server, system, or network. For instance, if the Paris servers are under maintenance or ceases to function, their IP address space is being stopped from announcing from that location to the Internet and service will be then automatically routed to an available server with the best alternative available route. Another purpose of Anycast routing is that it aids in mitigating the impact of DDoS attack on network infrastructure. DDoS attack refers to Distributed Denial-of-Service attack which is a malicious attempt to disrupt the regular traffic of a target server, service, or network by overwhelming the target or its surrounding infrastructure with a flood of Internet traffic. This renders the target server or the network resource unavailable to its intended users temporarily or indefinitely. Anycast routing can be deployed to distribute DDoS attacks and reduce their effectiveness. As, Anycast attracts the attacker's traffic across multiple data centres, thus, preventing any single location from becoming overwhelmed with requests. If the capacity of the Anycast network is greater than the attack traffic, the attack is effectively mitigated. Therefore, through implementing Anycast, a DDoS attack can be localized to a few nodes in the network and therefore not impact the entire service. Anycast also ensures high availability for the network infrastructure. A server that becomes unavailable due to failure or maintenance will have minimal impact on the network because the traffic will be automatically diverted to the next closest servers present in the network. Thus Anycast can be an efficient way to provide resilience and recovery while continuing the services in a partial state.

Another resilience measure alongside Anycast is the server clustering technique. A server cluster is nothing but a unified group of servers, distributed and managed under a single IP address, which serves a single entity to ensure higher availability, proper load balancing and system reliability. A two-node cluster, for instance, implies that if one server fails, the second will immediately take over. Server clustering can be done in different ways, depending on the requirements and priorities of a particular network. For instance, the high-availability cluster is a type of clustering that is specifically used to service high traffic websites, (e.g. online shopping websites). High-availability clusters are employed to ensure critical systems remain reliable for optimal, continuous performance. High-availability clusters also avoid points-of-failure because they are built on redundant hardware software. In this context, a redundant system (both hardware and software) refers to an alternative standby system that will provide failover or load balancing support in the event of an unexpected failure.

High Availability clusters can have two different architectures, either Active—Active or Active—Passive. An Active-Active cluster means all nodes work simultaneously to balance loads. On the other hand, an Active-Passive architecture means a primary node handles all workload, while a second is waiting to take over in case of downtime. When one component crashes, a secondary server, known as a hot spare or hot standby, immediately takes over, because the database from the primary server has already been replicated to other nodes. Thus, High Availability clusters guarantee minimal downtime in case of overload or server failure.

Load balancing clusters are another type of clustering the servers specifically to distribute user requests to multiple active nodes to accelerate operations, ensure redundancy, reduce network congestion and overload. Requests are handled by the load balancing software, which directs them to different servers, according to a set of rules or an algorithm, and then handles the outgoing response. High-availability clusters, for example, use a load balancer in an active-active configuration to respond to different requests and then distribute them to all independent servers. In an active-passive High Availability cluster, the load balancer monitors nodes' availability, so in case one shuts down, it doesn't send any more traffic to it until it is fully operational again. Server clustering can be seen as a feasible way to ensure resilience in network infrastructure as it provides failover support through load distribution. For instance, when a node fails, the work for which it is responsible is directed to another node or set of nodes. A clustered environment will maintain the servers fully operational because they provide continuous uptime. Moreover, the clustered servers are configured to work together on a single network to reduce risk vulnerability and boost network performance by eliminating single point of failure.

Another concept that is implemented to support network resiliency and recovery is redundancy. By definition, network redundancy is a duplicated infrastructure where additional or alternate instances of network devices and connections are installed to ensure an alternate path in case of a failure of the primary communication path. In simple terms, redundancy is the use of additional components to take over for the active component when the active component fails. Redundancy is essential because it creates fault tolerance and recovery within the network infrastructure, allowing it to remain functional despite sudden failures, malicious attacks, and other threats that cause downtime of a network link.

In a network, redundancy can be implemented at two levels: end-node and network-level redundancy. End-node redundancy involves the use of multiple network adapters to connect to the same network so that operation can continue even if one of the adapters fails. End-node redundancy is often used in server environments where a loss of connectivity can lead to significant disruption of operations. On the other hand, network-level redundancy involves implementing a network with redundant links and network equipment (e.g. routers and switches) as well as the use of protocol techniques like spanning tree protocol (STP) and routing protocol features like equal-cost multipath (ECMP).

When implementing network-level redundancy, it is necessary to evaluate redundancy from both a Layer 2 (Ethernet) and Layer 3 (IP routing and forwarding) perspective. Link aggregation is a type of network-level redundancy implemented at the Layer 2 level. The term link aggregation refers to various methods of aggregating (combining) multiple network connections in parallel in order to increase throughput and to provide redundancy in case one of the links should fail. A link aggregation process on the end node and the switch provides the control signalling and packet ordering for the links so that the applications are unaware of the link aggregation. For instance, if a network infrastructure has three links, then these three links will appear to be a single link to the switch so that the same MAC address will be used across these three links. Now, if one of the links fails, the others continue to operate so that the aggregated link appears as a lower speed link.

Another way of implementing redundancy at the Layer 2 level is by using the spanning tree protocol (STP) between switches. STP can also be utilized when multiple redundant links are employed between switches. Through STP, one of the switches will remain in a standby state or in other words, redundant state. This redundant switch will take over when the other switch fails. An enhancement to STP is achieved through multiple spanning tree protocol (MSTP). It provides for the STP to include VLAN related information. For example, designers could have a network with ten VLANs, of which three belong to one spanning tree and seven to another. This provides better utilization of redundant links than the standard STP and enables a degree of load balancing in the network.

At the Layer 3 level (IP routing and forwarding) redundancy can be implemented through virtual router redundancy protocol (VRRP). Virtual router redundancy protocol helps nodes recover from outages of the default router in a transparent manner. VRRP specifies an election protocol that dynamically assigns the default router responsibility to a specific router (the master) among a group of routers. If the default router fails, one of the other routers in the group takes over with the same default router IP address/MAC address, so that end nodes see no disruption.

The common MAC address used by all the routers in the VRRP group is known as a virtual MAC address. Since the end nodes have the same IP address and (virtual) MAC address mapping, they will not notice that a backup has taken over from the master. VRRP can also provide load balancing functions, for example, the same router that acts as a backup for one group of nodes can be the master for another group.

Different routing protocols can be utilized to implement redundancy and resilience at Layer 3 network topology. Protocols like RIP (routing information protocol) or OSPF (open shortest path first) aids in recovery from a failure in the network (a node or link going down) through a recalculation of routes to destination that were previously reachable via the failed node or link. When the new routing tables are created after this recalculation, forwarding of traffic resumes. Thus, packets will resume their flow between source and destination after this recovery. Most routing protocols do not permit use of this alternate route during normal operation. An exception is OSPF, which permits equal-cost multipath (ECMP) routing; for example forwarding of packets over multiple paths to the same destination as long as the paths have the same cost. Routing through multiple alternative paths through a network is commonly referred to as multipath routing. Thus, through these multipath routing protocols resilience and fault tolerance can be supported in a network infrastructure.

A different approach to implement resilience and fault tolerance is through Round-robin DNS. In its simplest implementation, round-robin DNS works by responding to DNS requests not only with a single potential IP address, but with a list of potential IP addresses corresponding to several servers that host identical services. Round-robin DNS is also used to achieve load balancing and load distribution between a number of Web servers. For example, a company has one domain name and three identical copies of the same web site residing on three servers with three different IP addresses. When a user tries to access the home page, the first IP address will be provided to that user. Similarly, for a second and third user who tries to access the homepage, the second and third IP addresses will be provided, respectively. In each case, once the IP address is given out, it goes to the end of the list. For the fourth user, therefore, the first IP address will be provided.

Apart from the methods discussed above, there are certainly more approaches to implementing resiliency in a network infrastructure. Ideally, a resilient network must address all areas of network elements such as switches, routers, servers, transmission interconnections, etc. so that the network does not have a single point of failures. In networking terms, a SPoF (single point of failure) is any non-redundant part of a network system that, if dysfunctional, would cause the entire network to fail. Subsequently, a standard resilient network must ensure automatic in-built failover procedure such that the failure of a single element within a group of similar elements does not cause degradation of service. Another feature of a standard resilient network is that it must provide ancillary services or supplementary service along with the resiliency measures—for example, DNS servers and other ancillary network elements that will enable the transmission of network traffic. Lastly, a resilient network must provide ideal network monitoring and management systems that allow network engineers to identify and rectify problems in an efficient manner. This also implies a degree of resilience of the network monitoring and management centres that house these systems.

SUMMARY

To improve the quality of the VPN service, a solution is proposed to redirect users traffic to multiple VPN endpoints to increase redundancy and availability. The proposed solution suggests creating a network configuration relying on regular IP stack routing techniques, where a user device connection doesn't rely on communicating through a singular overlay communication channel, instead establishing multiple tunneled connections with a VPN Service. By splitting the network traffic into a plurality of connections defined by multiple routes the user of a VPN Service can avoid a single point of failure. For example two active VPN tunnels between a VPN user and a VPN service provider may service the full scope network requests of the user, whereas a single VPN tunnel gets half of the device's traffic and the other VPN tunnel gets the other half of the traffic. This ensures the client side device always has some way to access the Internet without bypassing an encrypted VPN connection, avoiding reconnecting and potentially exposing unencrypted user traffic.

DESCRIPTION OF DIAGRAMS

FIG. 1A—is an exemplary component diagram that shows the overall architecture of components and context of at least one aspect of solution functions, whereas the VPN service components are dedicated either to Data or to Meta roles. The diagram also demonstrates the embodiment aspects where the VPN customer's device connects to a one VPN server Data and one VPN server Meta.

FIG. 1B—is an exemplary component diagram that shows the overall architecture of components and context of at least one aspect of solution functions, whereas the VPN server components may have multiple roles assigned to them. The diagram maintains the embodiment aspects where the VPN customer's device connects to a single VPN server for a Data channel and another VPN server for establishing a Meta channel.

FIG. 1C—depicts an exemplary component diagram that shows the overall architecture of components and context of at least one aspect of solution functions, whereas the VPN customer's devices connects to at least two VPN servers Data and to a single VPN server Meta. The distribution of roles across VPN servers is kept to a single-role design for better demonstration of the customer connectivity aspect.

FIG. 1D—depicts an exemplary component diagram that shows the overall architecture of components and context of at least one aspect of solution functions, whereas the VPN customer's devices connects to a one VPN server Data and at least two VPN servers Meta. The distribution of roles across VPN servers is kept to a single-role design for better demonstration of the customer connectivity aspect.

FIG. 1E is an exemplary embodiment comprising the components for Data connectivity failover procedure.

FIG. 2—depicts an exemplary component diagram that shows the overall architecture of components and context of at least one aspect of solution functions, whereas the VPN customer's device connects to a non-limited plurality of VPN servers Data and two or more VPN servers Meta. The distribution of roles across VPN servers is kept to a single-role design for better demonstration of the customer connectivity aspect.

FIG. 3A—depicts an exemplary implementation of routing at the User Device 102 when the Tunnel application 106 establishes one tunnel to a VPN server Data 110 (Data Channel 142 FIG. 1A) and one tunnel to a VPN server Meta 120 (Meta Channel 144 FIG. 1A), whereas the routing table of the User Device 102 is updated with two routes—the default all-encompassing route, further on called Second route, pointing toward Data channel 142 and the route for an individual address for Meta functionality, further on called First route, toward Meta channel 144.

FIG. 3B—demonstrates an exemplary implementation of routing at the User Device 102 when the Tunnel application 106 establishes one tunnel to a VPN server Data 110 (Data Channel 142), the second tunnel to a VPN server Data 170 (Data Channel 171 FIG. 1C), whereas the routing table of the User Device 102 is updated with three routes—the default all-encompassing route pointing toward Data channel 142, the more specific route for half of the IPv4 address space pointing toward Data channel 171, and the most specific route for an individual address for Meta functionality—toward Meta channel 144.

FIG. 3C, similarly to FIG. 3B, demonstrates an exemplary implementation of routing at the User Device 102, with the Tunnel application 106 establishing three tunnels, one toward a VPN server Data 110, and two tunnels toward VPN server Meta 120 and VPN server Meta 180.

FIG. 4 demonstrates an exemplary implementation of routing at a VPN server Meta 120, whereas the routing table contains at least two routes, with the default all-encompassing route pointing toward a non-existent destination, essentially dropping the packets, and the more specific route toward the IP address of the Meta services (e.g. internal DNS resolver) pointing toward the local Private IP address.

Figure 6:
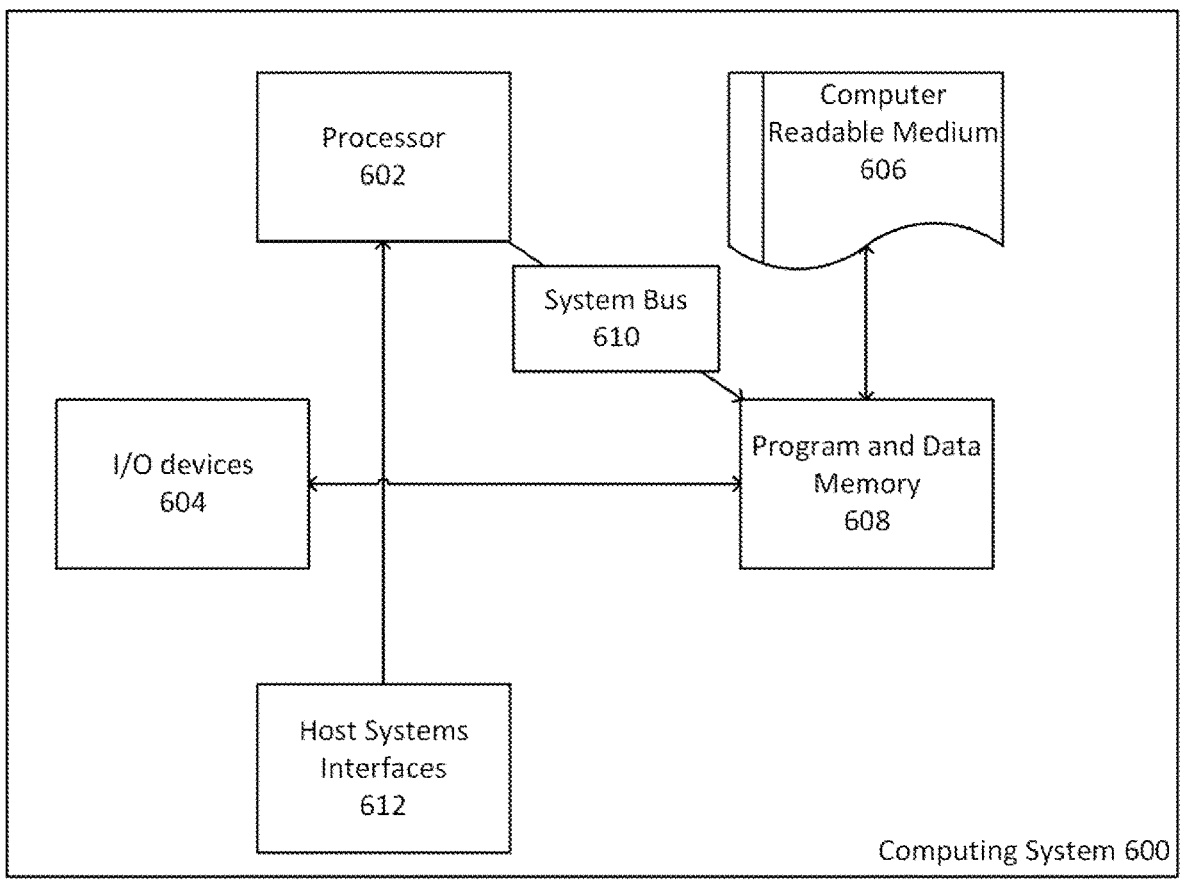

FIG. 6 demonstrates an exemplary computing system performing the methods disclosed.

DETAILED DESCRIPTION

Some general terminology descriptions may be helpful and are included herein for convenience and are intended to be interpreted in the broadest possible interpretation. Elements that are not imperatively defined in the description should have the meaning as would be understood by the person skilled in the art.

User device 102—a device belonging to a person or a business entity that is using VPN services. As a standard placed within a customer-grade network, working over such transport links as Wi-Fi, mobile data networks, residential networks. VPN application installed and executed within the User device initiates and establishes the encrypted VPN connection to a VPN server.

API application 104—a functional part of the VPN application dedicated to processing authentication against an VPN service provider infrastructure, as well as the application lifecycle management e.g. processing the updates and hotfixes for the application.

Tunnel application 106—a functional part of the VPN application dedicated to establishing, maintaining and terminating point-to-point connectivity between the User device 102 and the corresponding VPN servers.

VPN Server Data 110—a computing device attached to a computer network that accepts VPN users' requests for establishing encrypted connection, or tunnel, and is the endpoint of such encrypted connections from multiple VPN users. The type of VPN server is dedicated to serving the actual data traffic between the User device 102 and Target 160. The VPN server Data systems only service connection from authenticated service users.

VPN Server Meta 120—a computing device attached to a computer network that accepts VPN users' requests for establishing encrypted connection, or tunnel, and is the endpoint of such encrypted connections from multiple VPN users. The type of VPN server is dedicated to servicing a limited command exchange channel between the VPN users and VPN Service Provider. An example of a command exchange would be the VPN user's request for updating or changing a VPN server to connect to. The VPN servers Meta are servers that accept any connection without authorization and only provide access to specific resources within the same server, ie. the user's traffic cannot leave VPN server Meta.

Authentication service 114 and 124—the service dedicated to processing the authentication token provided by the VPN user after the successful authentication with the VPN Service. The providing of the token ensures the customer reaches the services provided.

VPN Service Provider Infrastructure 130—is a combination of hardware and software that provides functionality for multiple User Devices 102 via the Network 140. VPN Service Provider Infrastructure 130 can receive from the User Device 102 the request to establish a VPN connection and also can forward the hostname of a VPN server as well as provide the user's authentication token, dependent upon the successful authentication, for the VPN service available to the User Device 102. Specifically, VPN Service Provider Infrastructure 130 may contain the Server Selector 134 which is responsible for identifying the optimal server through in-built algorithms and computations and is one of the mechanisms that may be involved in specifying a VPN server for a particular customer request. The VPN Service Provider Infrastructure 130 also contains databases, which will persistently store the data necessary for servicing the VPN client. In some instances of the embodiment the VPN Service Provider Infrastructure 130 includes the Authentication Service 132 and the related User DB 136, Server Selector 134 with the related VPN Server DB 138. VPN service Provider Infrastructure 104 can be a combination of physical devices, virtual machines/servers, or can be located on the cloud.

API 131—VPN Service Provider Infrastructure component providing a collection of service endpoints exposing the functionality necessary for VPN customers to authenticate against VPN Service Provider, as well as to obtain the prerequisites necessary for establishing the encrypted connection to a VPN server.

Data channel 141 and similar—the communication established and executed between a VPN user 102 and a VPN Server Data 110 or similar.

Meta channel 143 and similar—the communication established and executed between a VPN user 102 and the VPN Server Meta 120 or similar.

Administrative channel 146—the communication established and executed between a VPN user 102 and the API 130 component of the VPN Service Provider Infrastructure 130.

Figure 5A:
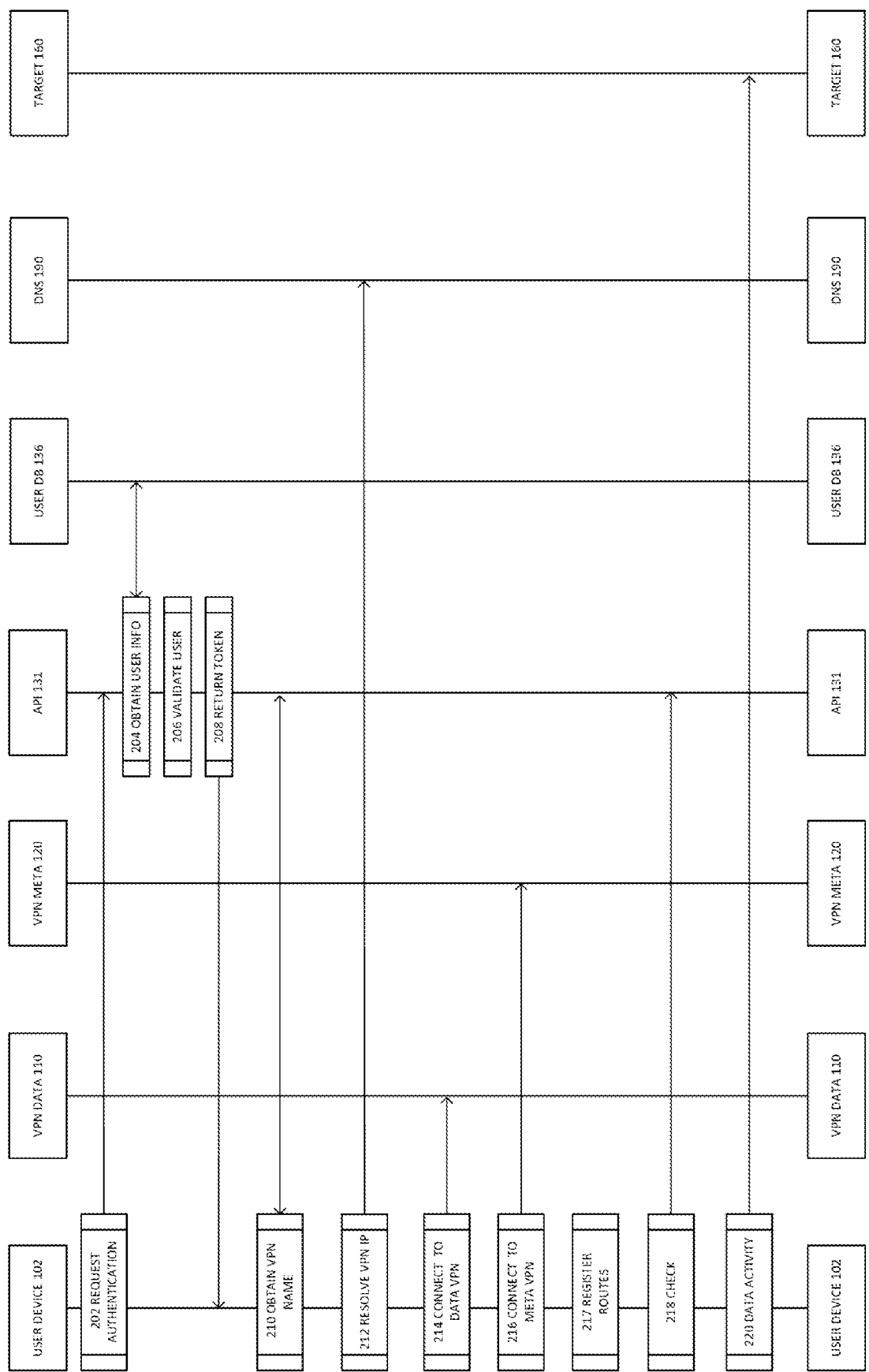
FIG. 5A is an exemplary sequence diagram describing a two-tunnel connection from a User device 102 to the VPN Service.
Figure 5B:
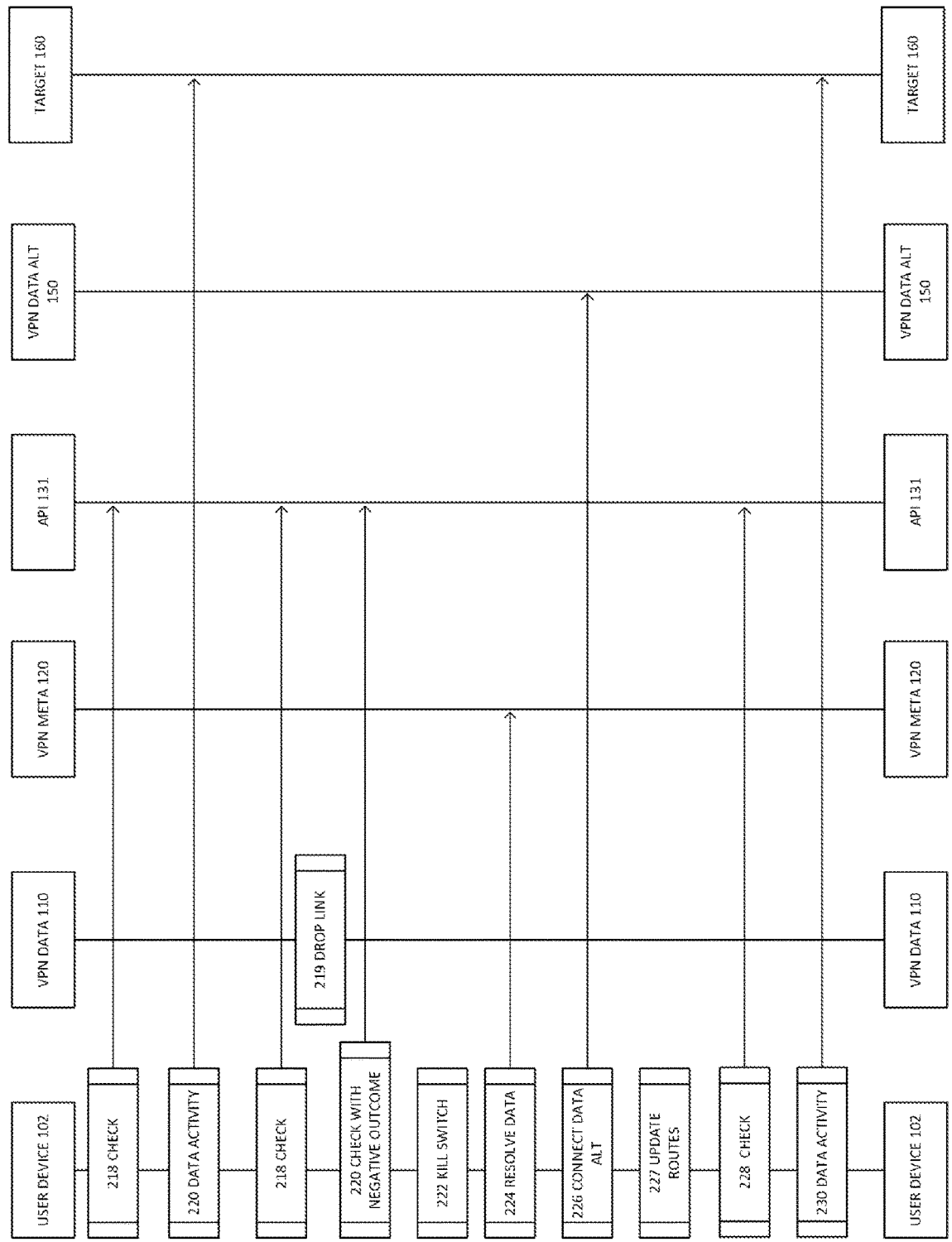
FIG. 5B is an exemplary sequence diagram describing a failover situation in a two-tunnel connection from a User Device 102 to the VPN service.

VPN server Data Alternative 150—a VPN server executing the role of Data traffic mediator between a User Device 102 and a Target 160 in case a primary VPN server Data 110 fails and a fail-over procedure is invoked (see FIG. 5B).

Target or Target server 160—a server serving any kind of content accessible over multiple protocols over the Internet. Most often a device placed within a datacenter network of high reliability and capability.

Network 140—a digital telecommunications network that allows network-attached nodes to communicate as well as share and consume resources. Examples of a network are local-area networks (LANs), wide-area networks (WANs), campus-area networks (CANs), metropolitan-area networks (MANs), home-area networks (HANs), Intranet, Extranet, Internetwork, Internet. For the purpose of describing the explicitly defined network paths of the traffic between the elements of the disclosed solution, and demonstrating the security regulations imposed on the communication therein, the Network 140 may be disclosed as multiple graphically disparate network elements within the diagrams.

Tunneling, Tunnel or Channel—a type of connectivity that allows for the secure movement of data from one network end-point to another. Tunneling involves allowing private network communications to be sent across a public network, such as the Internet, through a process called encapsulation. The encapsulation process allows for data packets to appear as though they are of a public nature to a public network when they are actually private data packets, allowing them to pass through unnoticed. Encapsulation allows the packets to arrive at their proper destination. At the final destination, decapsulation and decryption occur.

Kill-switch—a security safety mechanism used to programmatically shut off network connectivity immediately in an emergency, when it cannot be shut down in the usual manner. The primary purpose of the mechanism is to prevent unencrypted data becoming exposed on the network wire in case an encrypted VPN connection has failed.

DNS 190—Domain Name Services component serving resolution requests of the VPN user, usually belonging to the Internet Service Provider the user is communicating through.

User DB 136—a component of the VPN Service Provider Infrastructure 104 and a structured repository of authentication credentials belonging to the owners of multiple User Devices 102. It stores user related data in tables (named columns and multiple rows), where there is information included regarding the authentication credentials of the owner of User Device 108. It is responsible for verifying credentials of the owner of the User Device 102 and allowing the User Device 102 to connect with the VPN Service Provider Infrastructure 104. User Database 108 can be populated with user profiles continuously and is responsible for authenticating, authorizing multiple User Devices 102. User Database 108 can be any physical storage device or a cloud based storage.

Authentication Service 132—the component of the VPN Service Provider Infrastructure 130 serving the authentication, authorization and accounting requests from the VPN service front-end components facing the user.

Server selector 134—a logical unit and a constituent of the VPN Service Provider Infrastructure 130 that is configured to perform complex operations of identifying the optimal server from among the plurality of VPN Servers. Server Selector 134 is capable of querying VPN Server Database 138 for data regarding the VPN servers available for serving the connectivity requests from VPN users.

The present embodiments now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The overall design of the multi-path VPN service relies on the traffic being split in possibly numerous ways whereas the minimum amount is two routes and the maximum amount is the amount of IP addresses that exist (in an implementation described—IPv4, IPv6, or even both).

The traffic split is routed based on the targeted public IP addresses within the users requests. Public IP addresses can be rerouted through the VPN server and used for the control of the VPN traffic split by having a VPN tunnel for users activity traffic (a Data channel throughout this document) and a second VPN tunnel that is used for the control or changing of the users Data channel servers (a Meta channel throughout this document). Routing in the TCP/IP stack is based on specificity, with the routing path chosen by the most specific route corresponding to the destination. As an example if the configuration contains route A—0.0.0.0/0 (which would mean any ip address from 0.0.0.0 to 255.255.255.255)—and route B—0.0.0.0/1 and 128.0.0.0/1 (which combined would also mean any IP address)—the path is always going to be route B, since the route is more detailed and specific. In the case of a Meta channel the configuration can be as specific as necessary, with the most specific destination possible being a single private IP address. The actual private IP address selected is not important, whether it is 127.0.0.2 or 192.168.0.1. Targeting a specific private IP address, encapsulating it and rerouting it through the VPN server Meta opens up the possibility to get access to specific data and functionality required to control the user's Data channel throughout its lifecycle. This is useful if, for some reason, the user's current Data channel VPN server is no longer available. Though the setup described uses the two routes, which is the minimum for the design to be considered a multi-path VPN solution, there might be multiple Data channels or multiple Meta channels or any combination thereof.

Figure 1A:
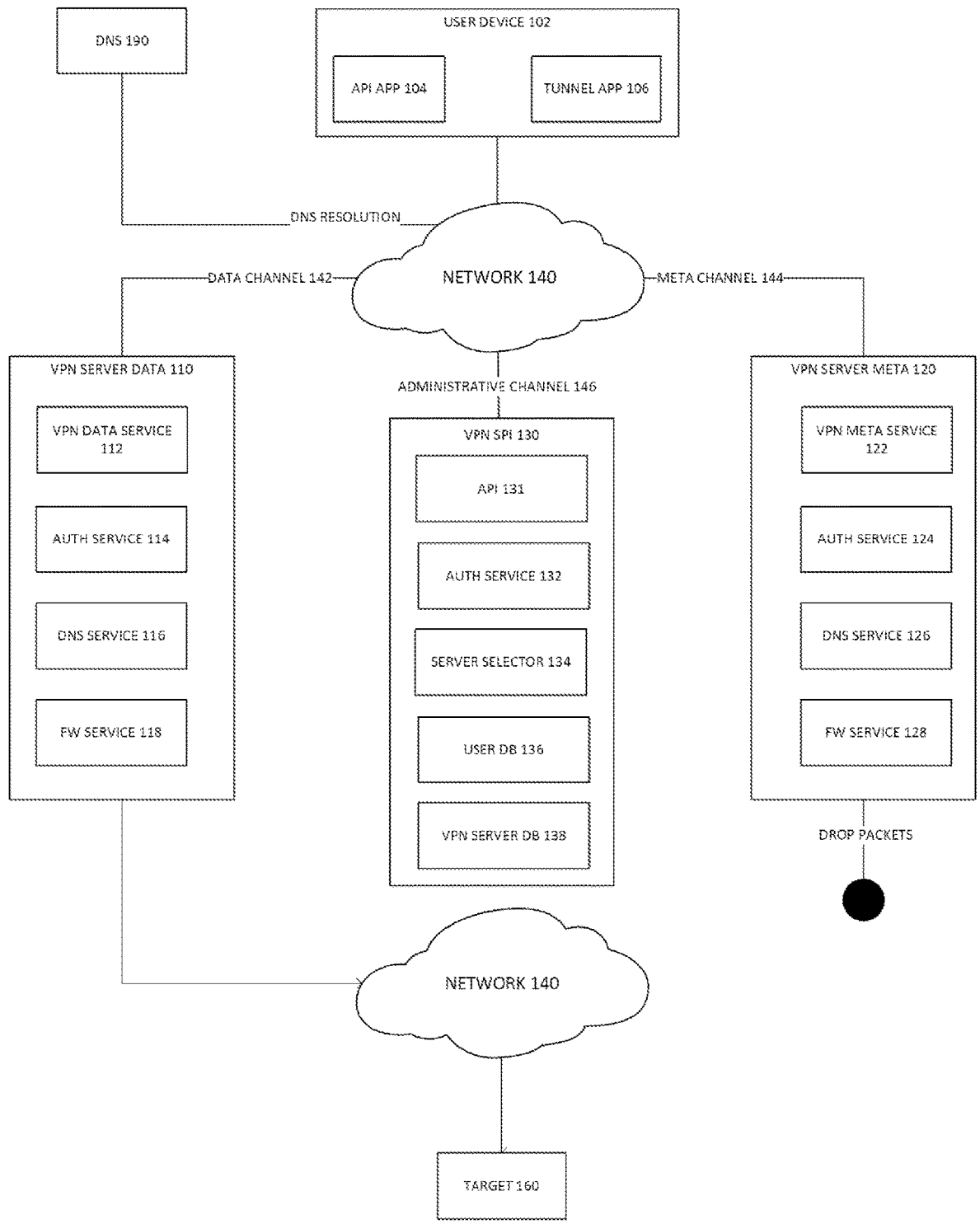

The generic setup for this kind of configuration would consist of an infrastructure of multiple VPN servers providing Data and Meta channel connectivity described in FIGS. 1A-1D. The User Device 102 should contain two services—the Tunneling application and the API service. The API service is used to acquire the list of VPN servers available and the Tunneling application is used to setup multiple tunnels to different servers and inform the network stack within the user's device to adjust the network routing table accordingly. As described in the configuration examples within FIGS. 1A to 1E and FIG. 2, there are multiple possible configurations for solution disclosed: FIG. 1A—a single Data channel and a single Meta channel, FIG. 1C—a single Meta channel and multiple Data channels, FIG. 1D—a single Data channel and multiple Meta channels, FIG. 1E—an exemplary embodiment comprising the components for Data connectivity failover procedure, and FIG. 2—multiple Data channels and multiple Meta channels.

The plurality of methods used to establish, maintain, failover and terminate VPN connectivity comprise the system depicted in FIG. 1A, which shows an exemplary component diagram of the overall architecture of the disclosed components and context of at least one aspect of solution functions. In at least one aspect, the present embodiments show the communications between the User Device 102 and the VPN Service Provider Infrastructure 130 to ultimately reach any Target 160 on the Network 140. The Service Provider Infrastructure 130 comprises API 131, Authentication Service 132, Server Selector 134, User Database 136 and VPN Server Database 138.

FIG. 1A shows that the User Device 102 and VPN servers of varying types are not a part of the VPN Service Provider Infrastructure 130. The User Device 102 can be any device that can connect to a Service Provider Infrastructure through any network, but in most cases it does so through the Internet. Such a device can be a computer, a mobile phone, a tablet, or any other electronic device. As demonstrated by FIG. 1A, Targets 160-161 are outside of the Service Provider Infrastructure 130 and are attached to Network 140. In most of the cases the Network 140 is the Internet.

The emphasis of the design depicted in FIG. 1A is the dedicated roles assigned to the VPN servers, whereas VPN User Device 102 establishes and maintains a single connection to a VPN Server Data 110 for processing the data communication with a Target system 160, and a single connection to a VPN Server Meta 120 for processing a command exchange channel between the VPN user Device 102 and VPN Service Provider, namely API 131. An example of command exchange would be the VPN user's request for a new VPN Server Data Alternative 150 (see FIG. 5B) to connect to in case of a critical failure communicating with the primary VPN Server Data 110.

The corresponding network routes may be provisioned within the User Device 102 pursuant to establishing the tunneled connections to the VPN server Data 110 and VPN server Meta 120. A Second route points toward the tunnel between the User Device 102 and the VPN server Data 110. A First route, that is narrower in scope than the Second route, points to the tunneled connection between the User Device 102 and the VPN server Meta 120.

The addressing scheme for both types of VPN servers is distinct since the VPN server Data 110 has its access within the public IP address space to be reached by customers from anywhere on the Internet, whereas the IP address of the Meta functionality is within the scope of private address space to be only reachable to users already connected to the VPN server Meta through an encrypted tunnel.

Another functional role of the connection to the VPN server Data 110 is to be the designated channel for performing connectivity tests initiated by the Tunnelling application 106—synthetic network activity of sending small packages of data, registering the response and possibly measuring the time it takes to obtain the response. Should the response be either unsuccessful or deemed too slow the Tunneling application 106 may initiate the request to VPN Server Meta 120 for obtaining a new VPN server Data 110. A response from the Meta channel should indicate the course of action for the User device 102—change the targeted Data channel to another IP address or change the hostname of the VPN server Data, or anything else that would be required to be able to proceed with the connection without reconnecting, thus avoiding extensive operations associated with such reconnect e.g. User Device key push, reauthorization etc.

Network 140 is depicted in FIG. 1A in two separate instances to illustrate that all traffic from the User Device 102 first passes through the encrypted tunneled VPN connections (the first instance of the Network 140), and then arrives at the target 160 (the second instance of the Network 140).

Figure 1B:
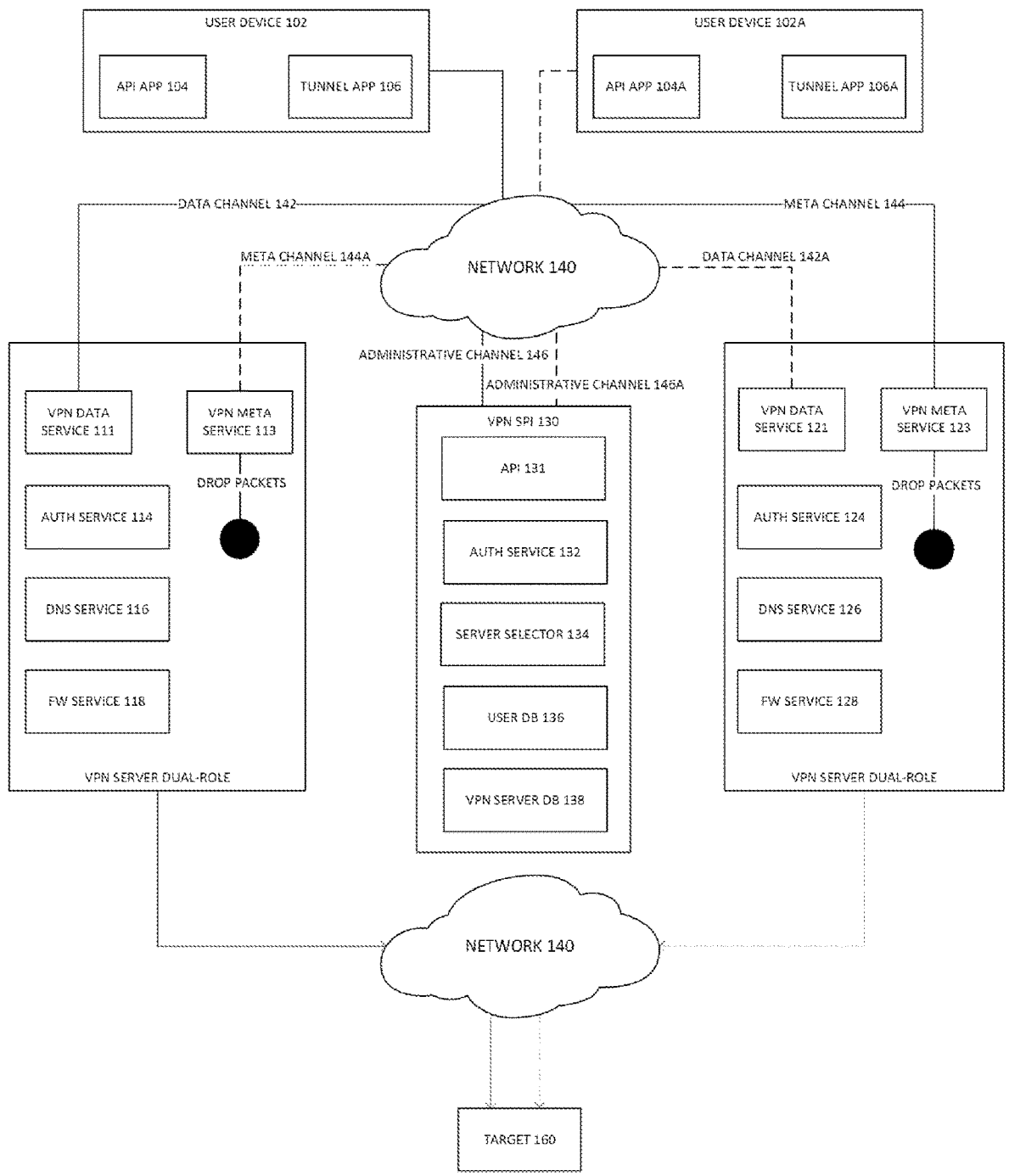

FIG. 1B describes a design similar to what FIG. 1A demonstrated, ie. the implementation of an exemplary component diagram of the overall architecture of the disclosed components and context of at least one aspect of solution functions, where VPN servers within the VPN Service scope may have multiple roles assigned to them in the context of the solution described. Namely each VPN server may have both Data and Meta roles assigned to it, with Data and Meta functionality organized as separate network-accessible services, listening either on differing public IP addresses or collocated on the single public IP address and listening on different ports. The overall functionality of Data and Meta services remains similar to the one defined for FIG. 1A, with Data servicing the actual data traffic the VPN user exchanges with the Targets on the Internet, and Meta providing the command exchange channel.

The control of the infrastructure supporting this embodiment would rely on the identical nature of each and every VPN server within the service scope since there is no distinction between a Data. VPN server and a Meta VPN server—any VPN server can support Data functionality, Meta functionality or both as described in FIG. 1B. The only difference is the port at which the functionality is provided, to differentiate between the services providing the functionalities since both types of connectivity have distinct configuration and are not compatible.

Network 140 is depicted in FIG. 1B in two separate instances to illustrate that all traffic from the User Device 102 first passes through the encrypted tunneled VPN connections (the first instance of the Network 140), and then arrives at the target 160 (the second instance of the Network 140).

Figure 1C:
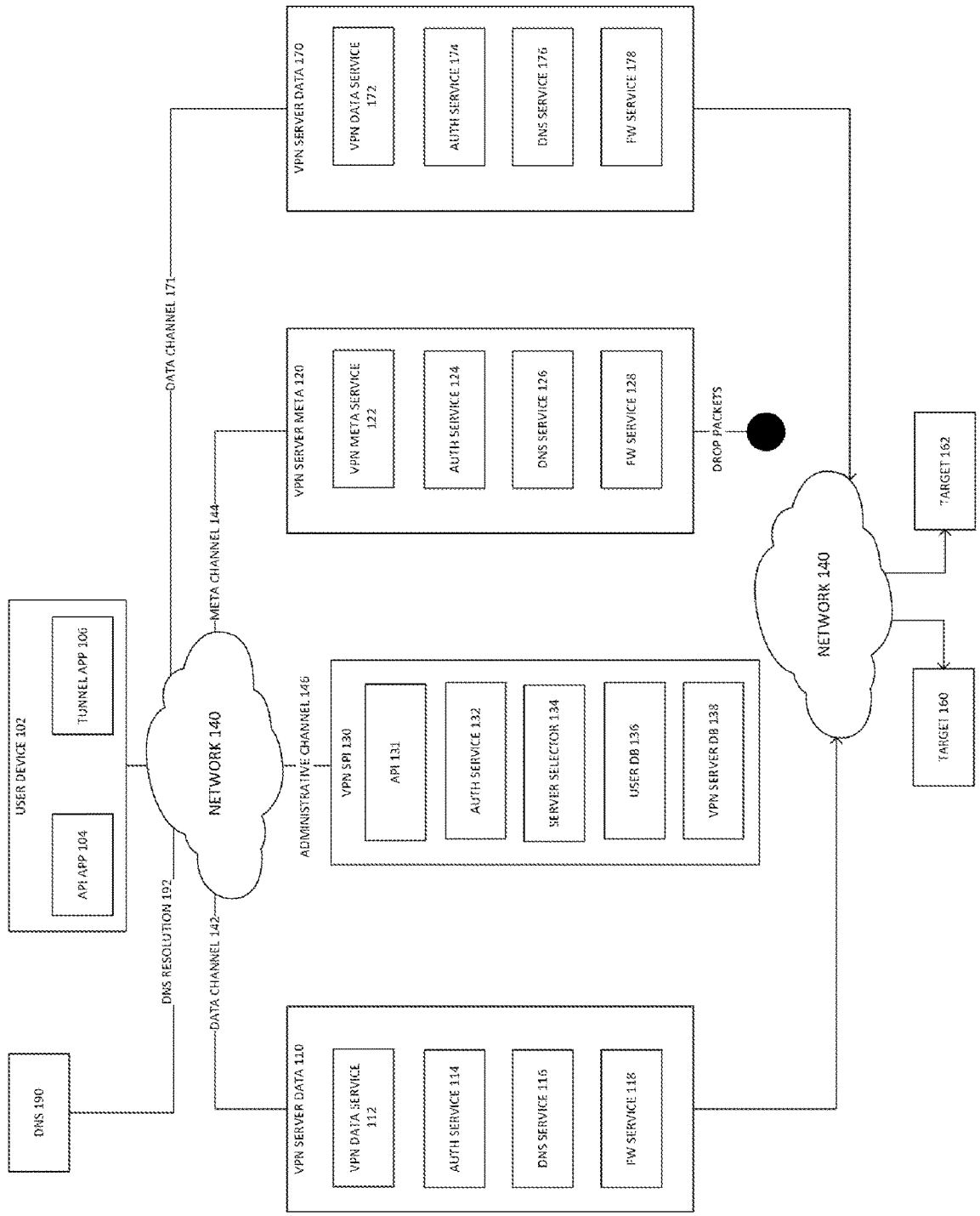

FIG. 1C depicts a setup similar to the one described in FIG. 1A with the essential differentiating factor of the user's data traffic being split into two separate channels, communicated across two disparate encrypted tunnels toward two individual VPN server Data 110 and VPN server Data 170, with the corresponding routing scheme implemented within the User Device 102 to support the split with half of the IP address space targeted at one channel and the other half at the other channel Should one of the Data channel servers be down, the tunneling app would access the Meta channel to acquire a substitute for the failing server. In one of the embodiments the routing scheme would be adjusted during the failed Data channel remediation process in the way that directs all the actual data traffic to the remaining Data channel.

Network 140 is depicted in FIG. 1C in two separate instances to illustrate that all traffic from the User Device 102 first passes through the encrypted tunneled VPN connections (the first instance of the Network 140), and then arrives at the target 160 (the second instance of the Network 140).

Figure 1D:
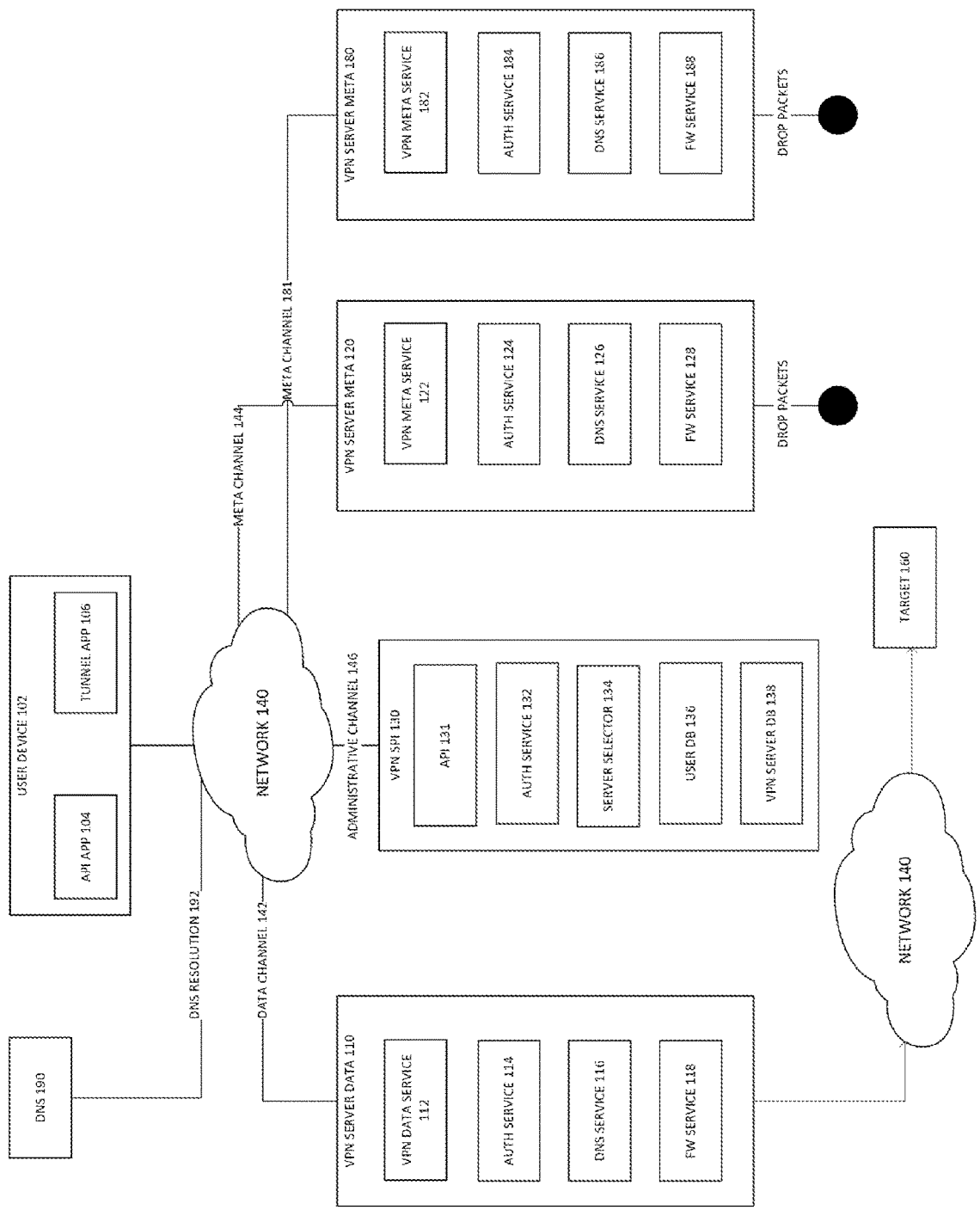

FIG. 1D depicts a setup similar to the one described in FIG. 1C with the differentiating factor of a redundant connection to a VPN server Meta 120 and VPN server Meta 180, with the corresponding routing scheme implemented within the User Device 102 to support the split of Meta traffic. The Data channel recovery flow persists in the same way as in examples described before, but by having multiple Meta channels the user command channel connectivity is ensured in that there will never be a dead-end connection if a tunneled connection to a VPN server Meta goes down. Meta channels can also provide insight for the Tunnelling application as to how to recreate other Meta channel connections in the course of actions similar to the one suggested for a Data channel recovery.

Network 140 is depicted in FIG. 1D in two separate instances to illustrate that all traffic from the User Device 102 first passes through the encrypted tunneled VPN connections (the first instance of the Network 140), and then arrives at the target 160 (the second instance of the Network 140).

Figure 1E:
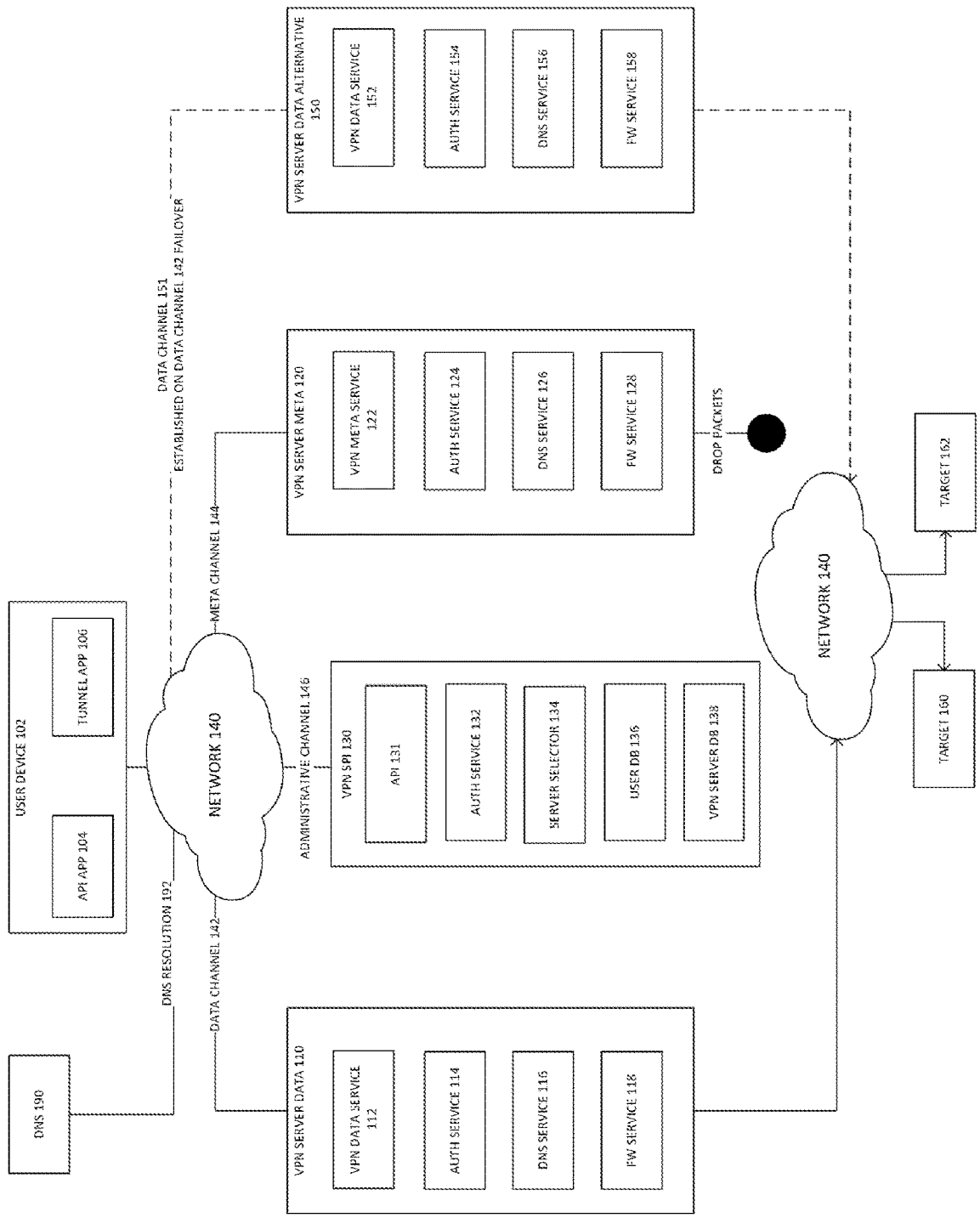

FIG. 1E is an illustration of an embodiment comprising the components that provide for the failover procedure of a failed tunneled connection to a VPN server Data 110. VPN server Data Alternative 150 is the VPN service connectivity endpoint provided to the User Device 102 by the VPN Service Provider Infrastructure 130 as the substitute for the failed VPN server Data 110.

Network 140 is depicted in FIG. 1E in two separate instances to illustrate that all traffic from the User Device 102 first passes through the encrypted tunneled VPN connections (the first instance of the Network 140), and then arrives at the target 160 (the second instance of the Network 140).

According to some embodiments, the VPN server Data 110, the VPN server Meta 120, the VPN SPI 130 and the VPN server Data Alternative 150 are provided or enabled by a single entity, such as a VPN service. The user device 102 uses the VPN service to connect securely to the target 160.

Figure 2:
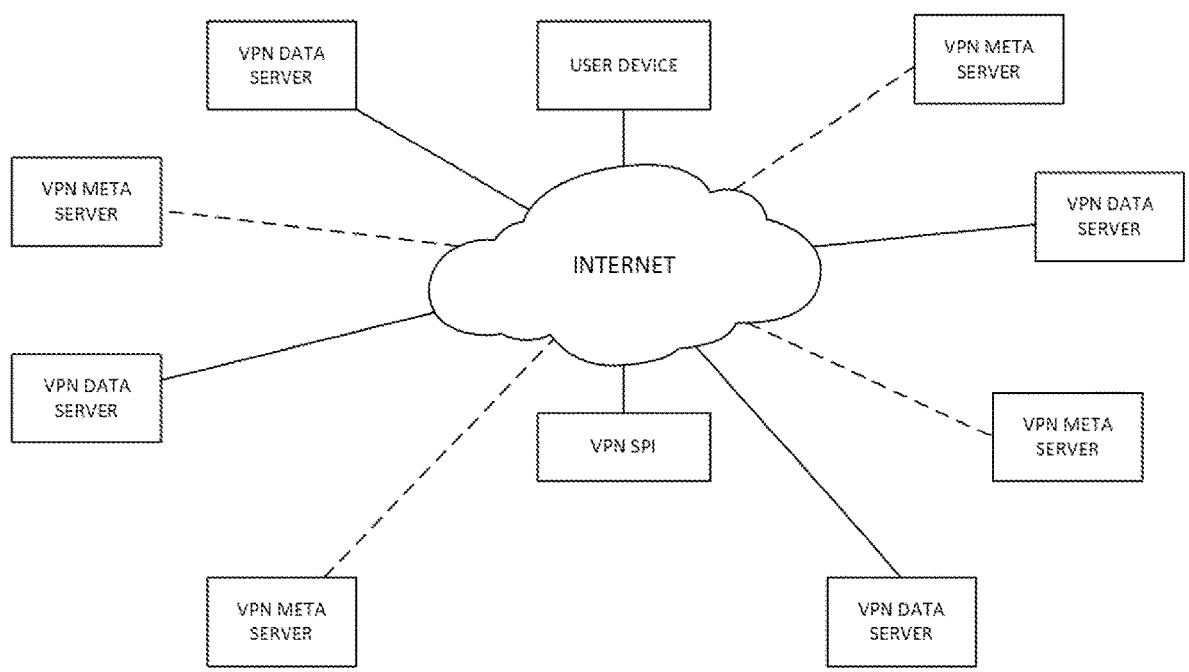

FIG. 2 gives an overview of the multi-path scheme where both Data and Meta traffic is distributed across and an unlimited number of VPN servers with the appropriate underlying functionality deployed. The corresponding routing scheme is implemented in the User Device 102. The number of channels of a particular type may be dynamically adjusted according to the results of monitoring network links, VPN server heath or the identified traffic type and load produced by the user e.g. additional Data channels may be procured if a streaming application has been hunched and identified within the User Device 102.

Figure 3A:
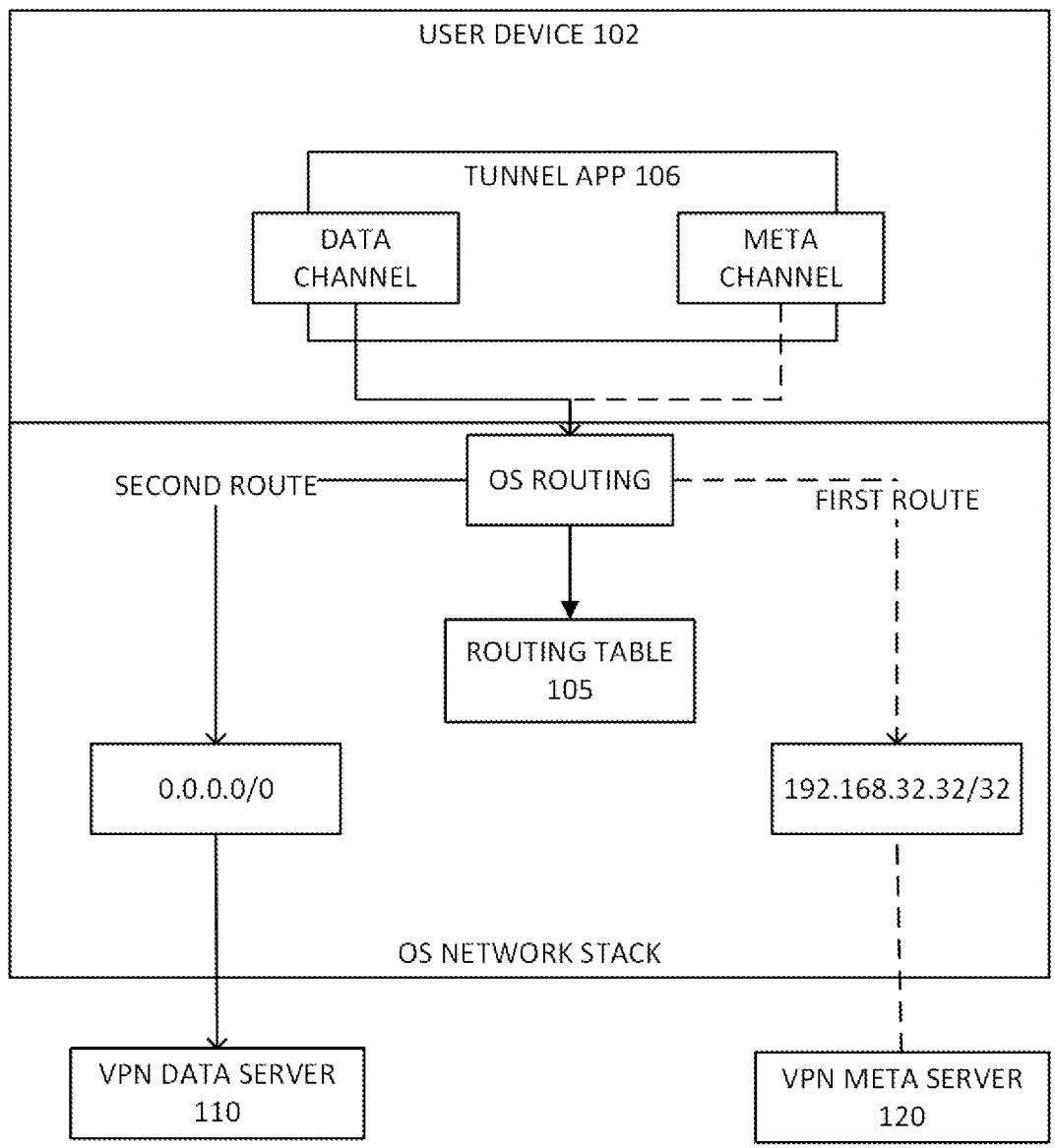

FIG. 3A provides the exemplary implementation of the routing scheme within the User Device 102 in the context of the setup described in FIG. 1, whereas the default all-encompassing route (Second route) pointing toward Data channel 142 of FIG. 1A and the specific route (First route) for an individual address for Meta functionality—toward Meta channel 144 of FIG. 1A.

Figure 3B:
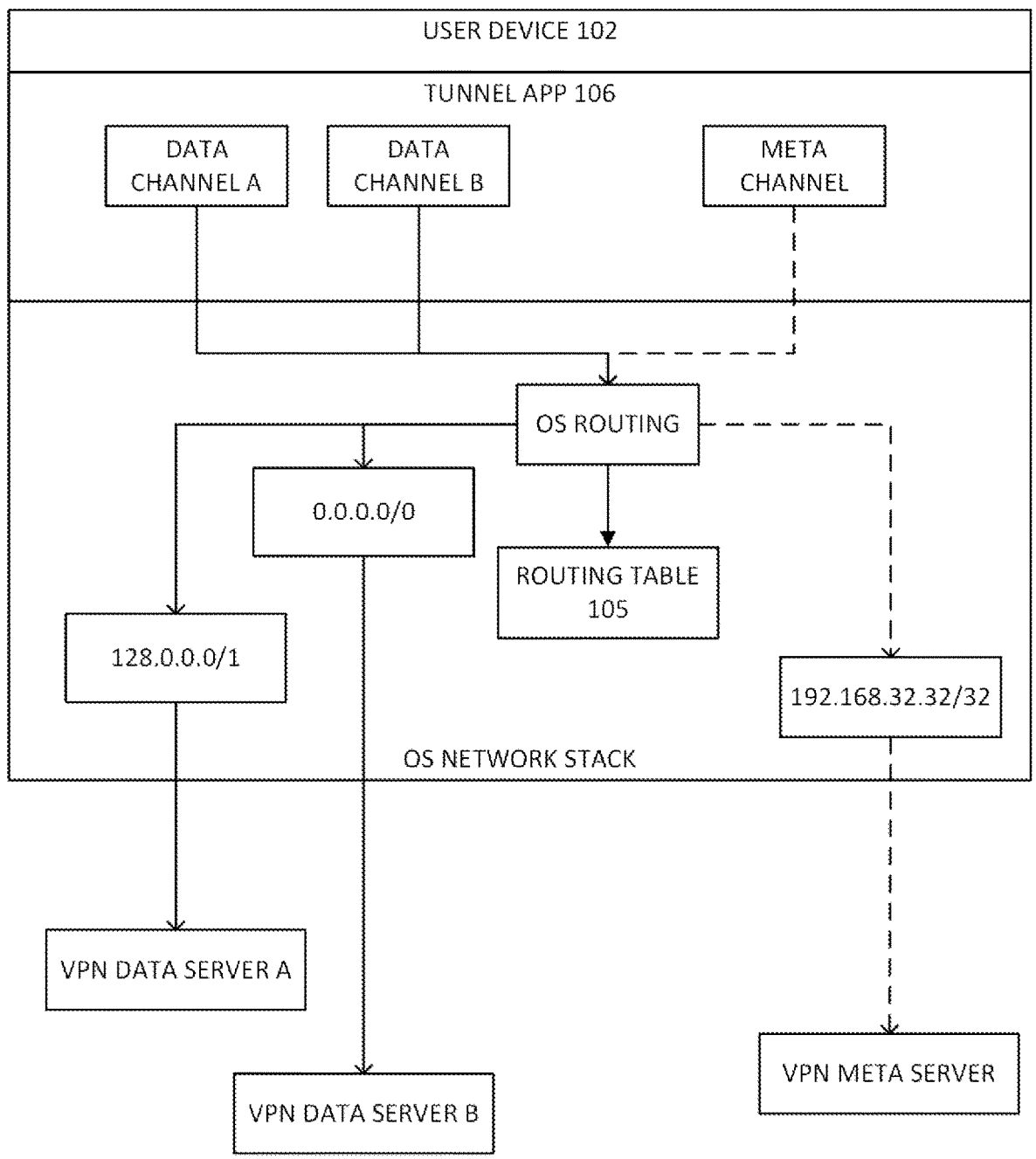

FIG. 3B describes a routing scheme for the User Device 102 in scope of the embodiment described in FIG. 1C, where the Data traffic is split across two distinct routes both covering an equal half of the potential IP address space (e.g. 0.0.0.0/0 and 128.0.0.0/1), and Meta functionality access across a tunnel established according to the most specific route targeted at an individual address of a VPN server Meta 120 (192.168.32/32).

Figure 3C:
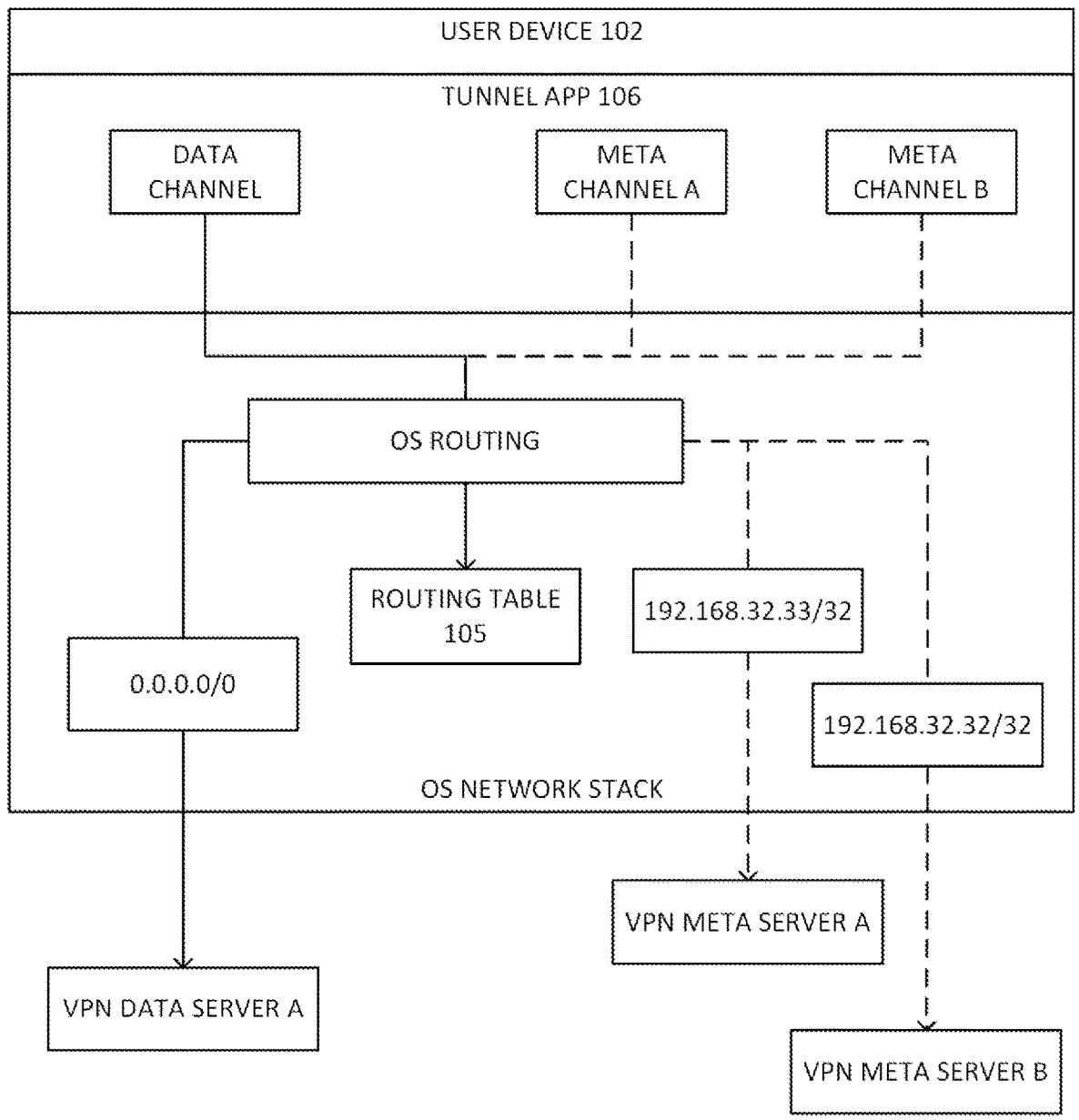

FIG. 3C depicts an exemplary routing scheme for the User Device 102 in scope of the embodiment described in FIG. 1D, where the Meta traffic is split across two distinct tunnels established according to routes both defined for two distinct VPN server Meta's IP addresses (192.168.32.32/32 and 192.168.33.32/32). The Data traffic remains directed according to the default nonspecific all-encompassing route covering the whole IP address space.

The routing scheme for the embodiment implementing a non-limited number of channels to multiple VPN servers Data and VPN servers Meta combines the approaches described in FIGS. 3A to 3C. Within the scope of the embodiment in case of a failure of any type of a tunneled link the corresponding traffic is immediately redirected over the remaining links of similar functionality while the failure is being remediated.

Figure 4:
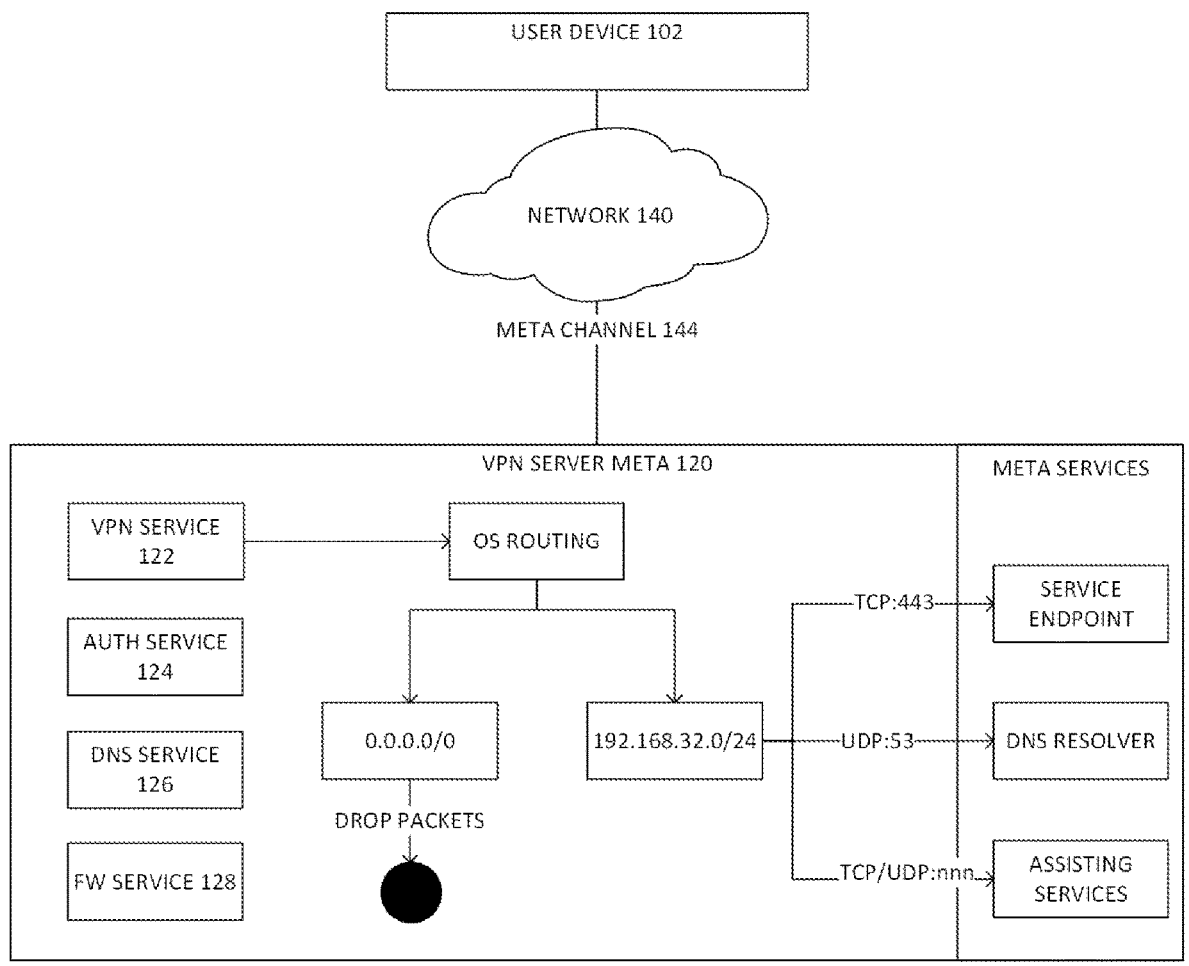

FIG. 4 describes an exemplary setup for the routing scheme within a VPN server Meta 120, where any packets arriving across the tunnel established with a User Device 102 and handled by the VPN server Meta should be discarded unless they target the specific private IP addresses that are configured beforehand. Services hosted within a VPN server Meta 120 that are instrumental in remediation of the failed Data or Meta channel connectivity should be hosted on the private IP addresses belonging to a private network implemented within each VPN server Meta. An exemplary implementation may include, but is not limited to, two services: a DNS resolver on port UDP 53 and a HTTP over TLS (HTTPS) service on port TCP 443. These services are presented here as an example and can be substituted with any kind of communication protocols for the required functionality.

FIG. 5A is a sequence diagram of an exemplary flow for establishing connectivity in the generic implementation of the solution proposed (e.g. FIG. 1A), with the User Device 102 connecting to one VPN server Data 110 and one VPN server Meta 120. The flow starts with the User Device 102 initiating authentication against the VPN Service Provider Infrastructure 130 at step 202, with the actual component providing authentication functionality being API 131. Steps 204 and 206 describe the steps of the Authentication process with the authentication token provided to the User Device 102 as the result at step 208. The authentication scheme employed is specified in an exemplary fashion and may factually result in procedures and artifacts involved being different from the described above.

Upon successful authentication User Device 102 requests, at step 210, the hostname, or hostnames, of a VPN server, or servers, available for establishing a secure connection. As the result of this step the user obtains hostnames for the resources requested e.g. hostnames for VPN server Data 110 and VPN server Meta 120. An alternative way of obtaining the hostnames for the initial connection may also be corresponding records contained within the VPN application configuration, maintained and updated with the application itself. The hostnames are resolved at step 212 through contacting the DNS system 190. Besides the IP address for each hostname requested the DNS system may also provide the additional information regarding the VPN servers in scope, through the corresponding records e.g. TXT record. An exemplary object obtained may be an encryption key that belongs to the corresponding VPN server, in one of the embodiments the key may be a Public Key of an asymmetric key pair belonging to the VPN server.

The IP addresses obtained in this manner may be plain public IP addresses assigned to a physical computing node. In some embodiments however the IP addresses may be an Anycast address, or be a Virtual IP address assigned to a clustered group of computing resources. In other embodiments the IP address provided may be part of a round-robin scheme where a host record in a DNS zone has multiple IP addresses assigned and a different IP address is provided for each new resolving request.

At step 214 the User Device 102 establishes a tunnelled connection to the VPN server Data 110 employing the procedures, technologies, authentication and authorization schemes, as well as protocols corresponding to the choice of technologies deployed within the VPN server connected.

In the same manner the tunnel connection is established between the User Device 102 and the VPN server Meta 120 in step 216. While for the connection to VPN server Data 110 the tunnelled connection employes the private IP addresses necessary for the customer traffic to be forwarded to the Target 160, the private IP addressing scheme employed in the context of connection to the VPN server Meta 120 ensures that the Meta services are available to the VPN user connected.

Establishing the connections to the VPN servers also results in the registration of new routes (a First route and a Second route in step 217) within the routing table of the User Device 102 which is part of the network stack of the Operating system, with the tunnel toward VPN server Meta 120 registered as the destination for traffic related to communication with the VPN server Meta 120 as defined by the First route, and with the tunnel toward VPN server Data 110 registered as the default routing destination for traffic to any target on the Internet, as defined by the Second route.

After the VPN connectivity between the User Device 102 and at least two VPN servers is established, a regular periodic connectivity check is initiated at step 218, from the User Device 102 to a destination on the Internet. The connectivity check is necessarily routed through the connection to the VPN server Data 110 to ensure the data connection is functioning properly. The constant check is ongoing at all times while the data connection is being utilized (starting at step 220).

FIG. 5B is the continuation flow of establishing the multi-path VPN connectivity described in FIG. 5A, with the subject of FIG. 5B being the Data connection failover. The flow starts with the User Device 102 performing a connectivity check at step 218 and utilizing the Data connection for data traffic in an instance of step 220. While checking the Data connection a link failure (occurred at step 219) is discovered by not getting a response to a regular connectivity check at step 221. In one of the embodiments, to avoid exposing unencrypted data traffic a kill-switch functionality may be introduced at step 222, essentially blocking any traffic toward any Internet target until a functioning encrypted connection is identified at the User Device 102 by introducing the default route that directs all outgoing packets to a destination with no further processing e.g. the loopback interface with the standard IP address of 127.0.0.1. The remediation process is commenced at step 224 by resolving the hostname for the VPN server Data 110 through the connection to VPN server Meta 120 i.e. utilizing the internal DNS service within the VPN server Meta. In some embodiments the hostname of the VPN server Data 110 is an A record with multiple IP addresses that are rotated in a round-robin scheme, therefore every time a VPN customer resolves it—a different IP address from the list is provided. If the IP address obtained is the same as the one of the failed VPN server Data 110 the DNS resolution step is repeated until a different IP address is obtained. At step 226 the connection is initiated to the IP address of VPN server Data Alternative 150. The establishing of said connection triggers updating the routing table of the Operating system within the User Device 102 at step 227, with the tunnel toward VPN server Data Alternative 150 registered as the default routing destination for traffic to any target on the Internet. Finalizing the failover flow at step 228 is the re-establishing the connectivity check against a destination on the Internet through the tunnel toward the VPN server Data Alternative 150. The result of the failover flow is the data traffic starts travelling along the same tunnel toward the Target 160 at step 230.

Fail-over mechanism for both Data and Meta connectivity is aligned to the employed discovery mechanism. As described above an exemplary option for VPN server Data connectivity may be DNS round-robin, where the hostname of the VPN server Data stays the same but it is resolved to a different IP address each time User Device 102 approaches the DNS for the corresponding A record. For a VPN server Meta discovery an exemplary option may be Anycast functionality, where the IP address of the VPN server Meta stays identical across multiple physical servers and User Device is connecting to a new physical VPN server Meta each time the User Device initiates a connection to the IP address.

An alternative method of triggering the change of VPN server Data connectivity may be the VPN Server Provider Infrastructure informing the User Device of the necessity to connect to a different VPN server Data or signalling, or commanding, the User Device to initiate a fail-over procedure.

The infrastructure is constantly monitoring it's own Meta and Data channel server performance and is looking for underperforming ones. The servers used can also be marked for maintenance manually by infrastructure administrators. On occasions where the infrastructure itself identifies a problem in a specific server, or when a server is prepared for maintenance, the User Device is informed in one of two possible ways—Active (push) or passive (pull) notifications via the Meta channel Within the passive notification approach, the User Device is constantly checking for any updates on the status of the servers that are used in its routing configuration, whereas in the active notifications approach the User Device is listening for notifications through any of its Meta channels regarding changes in the performance or status of the VPN servers that the User Device has connected to. Both active and passive methods rely on the API for informing about changes in server performance or status where such updates may contain signals, or commands, triggering a particular action, or chain of actions, within the User Device e.g. VPN server Data connectivity fail-over.

According to some embodiments, a method for creating a multi-path VPN connection comprises authenticating, by an API 131 within a VPN Service Provider Infrastructure (SPI) 130, a User Device 102 communicably coupled to the VPN SPI 130 via a network 140. Pursuant to the request from the user device, at least a hostname or an IP Address for a VPN server Data and a VPN server Meta is sent, from the API 130, to the user device 102. A tunneled connection between at least one VPN server Data 110 and the User Device 102 is established by the VPN server Data 110, and a tunneled connection between at least one VPN server Meta 120 and the User Device is established by the VPN server Meta 120. A First route for traffic targeted for the VPN server Meta 120 is registered at the User Device 102, with the First route directed toward the VPN server Meta tunnel, and a Second route for traffic other than the traffic targeted for the VPN server Meta 120 is registered at the User Device, with the Second route directed toward the VPN server Data tunnel. The traffic targeted for the VPN server Meta through the VPN server Meta tunnel is directed from the User Device 102 according to the First route, and received at the VPN server Meta 120. The traffic other than the traffic targeted for the VPN server Meta is directed from the User Device 102 according to the Second route, and received at the VPN server Data 110.

In another embodiment a method for monitoring the health of the tunneled connection between the User Device 102 and the VPN server Data 110 comprises periodically checking the connectivity against a destination on the Internet.

In an embodiment a similar method for monitoring the health of the tunneled connection between the User Device 102 and the VPN server Meta 120 comprises periodically checking the connectivity against a destination within the VPN server Meta 120.

An embodiment of the method for monitoring the connectivity between the User Device 102 and the VPN server Data 110 comprises the steps of checking the connectivity against a target on the Internet and may result in initiating a failover procedure pursuant to obtaining a negative connectivity check result designating a failed connection.

In yet another embodiment the method of maintaining a multi-path VPN connection comprises VPN Service Provider Infrastructure (SPI) 130 periodically checking the VPN server Data 110 and the VPN server Meta 120. Pursuant to the result of the monitoring the VPN service Provider Infrastructure 130 may signal, through the tunneled connection to the VPN server Meta, for the User Device 102 to initiate the tunneled connection to the VPN server Data 110 fail-over procedure.

As defined by another embodiment the method for restoring a failed multi-path VPN connection comprises establishing a tunneled connection between the User Device 102 and an VPN server Data Alternative 150 by providing either a hostname or an IP address for a VPN server Data from a DNS service within the VPN server Meta 120 to the User Device 102, through the tunneled connection to the VPN server Meta 120. Correspondingly, the routing table of an Operating system of the User Device 102 is updated with the Second route pointing toward the tunneled connection to the VPN server Data Alternative 150, wherein the traffic from the User Device is directed according to the Second route, and is received at the VPN server Data Alternative.

According to another embodiment the method of restoring a failed multi-path VPN connectivity between the User Device 102 and VPN server Data 110 comprises VPN Service Provider Infrastructure 130 instructing the User Device 102 to initiate a VPN connection failover procedure by connecting to the VPN server Data Alternative 150. Consequently, the DNS service within the VPN server Meta 120 provides, pursuant to the request from the User Device 102, at least a hostname or an IP address of the VPN server Data Alternative 150. As a result a tunneled connection to the VPN server Data Alternative 150 is established at the User Device 102. The routing table of the Operating system within the User Device is updated with the Second route pointing toward the tunneled connection to the VPN server Data Alternative 150. The tunneled connection to VPN server Data 110 is terminated, whereas the VPN server Data Alternative 150 ultimately receives the traffic directed within the User Device 102 according to the Second route at the User Device 102.

In an embodiment of the method for creating a multi-path VPN connection the number of concurrent tunneled VPN connections to an exemplary VPN server Data and concurrent tunneled connection to an exemplary VPN server Meta are unlimited for the duration of a single VPN connectivity session.

In yet another embodiment the method for monitoring a tunneled connectivity to a VPN server Data 110 comprises the User Device 102 performing a connectivity test by sending a packet of data to a target on the Internet through a tunneled connection to a VPN server Data 110, consequently registering the response from the target on the Internet to the sent packet of data, and, lastly, measuring the time taken to obtain the response.

An embodiment of the method for monitoring a tunneled connectivity to a VPN server Meta 120 comprises the User Device 120 is performing a connectivity test by sending a packet of data to a target within the VPN server Meta 120 through a tunneled connection to a VPN server Meta 120, consequently registering the response from the target within the VPN server Meta 120 to the sent packet of data, lastly, measuring the time taken to obtain the response.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. FIG. 6 illustrates a computing system 600 in which a computer readable medium 606 may provide instructions for performing any of the methods disclosed herein.

Furthermore, the embodiments can take the form of a computer program product accessible from the computer readable medium 606 providing program code for use by or in connection with a computer or any instruction execution system. For the purposes of this description, the computer readable medium 606 can be any apparatus that can tangibly store the program for use by or in connection with the instruction execution system, apparatus, or device, including the computer system 600.

The medium 606 can be any tangible electronic, magnetic, optical, electromagnetic, infrared, or semiconductor system (or apparatus or device). Examples of a computer readable medium 606 include a semiconductor or solid state memory, magnetic tape, a removable computer diskette, a random access memory (RAM), NAND flash memory, a read-only memory (ROM), a rigid magnetic disk, and an optical disk. Some examples of optical disks include compact disk—read only memory (CD-ROM), compact disk—read/write (CD-R/W) and digital versatile disc (DVD).

The computing system 600, suitable for storing and/or executing program code, can include one or more processors 602 coupled directly or indirectly to memory 608 through a system bus 610. The memory 608 can include local memory employed during actual execution of the program code, bulk storage, and cache memories which provide temporary storage of at least some program code in order to reduce the number of times code is retrieved from bulk storage during execution. Input/output or I/O devices 604 (including but not limited to keyboards, displays, pointing devices, etc.) can be coupled to the system either directly or through intervening I/O controllers. Network adapters may also be coupled to the system to enable the computing system 600 to become coupled to other data processing systems, such as through host systems interfaces 612, or remote printers or storage devices through intervening private or public networks. Modems, cable modem and Ethernet cards are just a few of the currently available types of network adapters.

The embodiments disclose a method for creating a multi-path VPN connection, the method comprising: a. authenticating, by an API within a VPN Service Provider Infrastructure (SPI), a User Device communicably coupled to the VPN SPI via a network; b. sending, from the API, to the user device, pursuant to the request provided by the user device, at least a hostname or an IP Address for a VPN server Data and a VPN server Meta; c. establishing, by the User Device, a tunneled connection to at least one VPN server Data; d. establishing, by the User Device, a tunneled connection to at least one VPN server Meta; e. registering, at the User Device, a First route for traffic targeted for the VPN server Meta, with the First route directed toward the VPN server Meta tunnel; f. registering, at the User Device, a Second route for traffic other than the traffic targeted for the VPN server Meta, with the Second route directed toward the VPN server Data tunnel; g. directing, from the User Device, the traffic targeted for the VPN server Meta through the VPN server Meta tunnel, according to the First route; h. receiving, at the VPN server Meta, the traffic targeted for the VPN server Meta, according to the First route; i. directing, from the User Device, the traffic other than the traffic targeted for the VPN server Meta, according to the Second route; and j.

receiving, at the VPN server Data, the traffic other than the traffic targeted for the VPN server Meta, according to the Second route.

The method is enclosed where the tunneled connection to the VPN server Data is periodically checked, at the User Device, against a destination on the Internet. The tunneled connection to the VPN server Meta is periodically checked, at the User Device, against a destination within the VPN server Meta.

In the method that is disclosed, responsive to the User Device identifying the tunneled connection to the VPN server Data as failing, the User Device initiates the tunneled connection fail-over procedure.

In another embodiment of the disclosed method for creating a multi-path VPN connection, a VPN Service Provider Infrastructure (SPI) periodically checks the VPN server Data and the VPN server Meta. Responsive to the VPN server Data failing, the VPN service Provider Infrastructure signals, through the tunneled connection to the VPN server Meta, for the User Device to initiate the tunneled connection to the VPN server Data fail-over procedure.

In the another embodiment of the method disclosed, the User Device connects to VPN server Data Alternative by: a. sending, from the API to the User Device, through the tunneled connection to the VPN server Meta, pursuant to the request provided by the user device, at least a hostname or an IP Address for the VPN server Data and the VPN server Meta; b. establishing, from the User Device, a tunneled connection to the VPN server Data Alternative; c. updating, at the user device, a routing table of an Operating system of the User Device with the Second route pointing toward the tunneled connection to the VPN server Data Alternative; d. directing, the traffic from the User Device according to the Second route; and e. receiving, at the VPN server Data Alternative, the traffic directed from the User Device according to the Second route.

Yet in another embodiment, the User Device is instructed by the VPN Service Provider Infrastructure to connect to VPN server Data Alternative by: a. signaling, by the VPN Service Provider Infrastructure (SPI), the User Device to initiate the tunneled connection to the VPN server Data fail-over procedure; b. obtaining, by the User Device from the API, through the Meta tunnelled connection, at least one of a hostname or an IP address of the VPN server Data alternative; c. sending, from the API, through the tunneled connection to the VPN server Meta, to the user device, pursuant to the request provided by the user device, at least a hostname or an IP Address for a VPN server Data Alterative; d. establishing, by the User Device, a tunneled connection to the VPN server Data Alternative; e. updating the routing table of the Operating system within the User Device with the Second route directed toward the tunneled connection to the VPN server Data Alternative; f. terminating, at the User Device, the tunneled connection to VPN server Data; g. directing the traffic, at the User Device, according to the Second route; and h. receiving, at the VPN server Data Alternative, the traffic directed within the User Device according to the Second route.

In the method disclosed, the number of concurrent tunneled VPN connections to a VPN server Data and concurrent tunneled connection to a VPN server Meta are unlimited for the duration of a single VPN connectivity session.

In the embodiments disclosed the User Device is performing a connectivity test by: sending a packet of data to a target on the Internet through a tunneled connection to a VPN server Data; registering the response from the target on the Internet to the sent packet of data, and measuring the time taken to obtain the response.

In the embodiments disclosed the User Device is performing a connectivity test by: sending a packet of data to a target on the VPN server Meta through a tunneled connection to a VPN server Meta; registering the response from the target within the VPN server Meta to the sent packet of data, and measuring the time taken to obtain the response.

Yet another embodiment discloses a method for creating a multi-path VPN connection, the method comprising: a. authenticating, by an API within a VPN Service Provider Infrastructure (SPI), a User Device communicably coupled to the VPN SPI via a network; b. sending, from the API, to the user device, pursuant to the request provided by the user device, at least a hostname or an IP Address for a VPN server Data and a VPN server Meta; c. establishing, by at least one VPN server Data, in response to a request from the User Device, a tunneled connection between the User Device and the at least one VPN server Data; d. establishing, by at least one VPN server Meta, in response to a request from the User Device, a tunneled connection between the User Device and the at least one VPN server Meta; e. receiving, at the VPN server Meta, traffic targeted for the VPN server Meta according to a First route directed toward the VPN server Meta tunnel, wherein the First route is registered at the User Device, and wherein the traffic targeted for the VPN server Meta through the VPN server Meta tunnel according to the First route is directed from the User Device; and f. receiving, at the VPN server Data, traffic other than the traffic targeted for the VPN server Meta according to a Second route directed toward the VPN server Data tunnel, wherein the Second route is registered at the User Device, and wherein the traffic other than the traffic targeted for the VPN server Meta through the VPN server Data tunnel according to the Second route is directed from the User Device.

Another embodiment discloses a non-transitory computer readable medium for creating a multi-path VPN connection, the medium comprising instructions that, when executed by a processor, direct the processor to: a. establish a tunneled connection to at least one VPN server Data at a User Device; b. establish a tunneled connection to at least one VPN server Meta at a User Device; c. register a First route for traffic targeted for the VPN server Meta, with the First route directed toward the VPN server Meta tunnel at a User Device; d. register a Second route for traffic other than the traffic targeted for the VPN server Meta, with the Second route directed toward the VPN server Data tunnel at a User Device; e. direct the traffic targeted for the VPN server Meta through the VPN server Meta tunnel, according to the First route, at a User Device; f. receive, at the VPN server Meta, the traffic targeted for the VPN server Meta, according to the First route; g. direct, from the User Device, the traffic other than the traffic targeted for the VPN server Meta, according to the Second route; and h. receive, at the VPN server Data, the traffic other than the traffic targeted for the VPN server Meta, according to the Second route.

The non-transitory computer readable medium is disclosed, wherein the tunneled connection to the VPN server Data is periodically checked, at the User Device, against a destination on the Internet. The tunneled connection to the VPN server Meta is periodically checked, at the User Device, against a destination within the VPN server Meta.

In the non-transitory computer readable medium, responsive to the User Device identifying the tunneled connection to the VPN server Data as failing, the User Device initiates the tunneled a Data connection fail-over procedure. The VPN Service Provider Infrastructure (SPI) periodically checks the VPN server Data and VPN server Meta.

In the non-transitory computer readable medium, responsive to the VPN server Data failing, the VPN service Provider Infrastructure signals, through the tunneled connection to the VPN server Meta, for the User Device to initiate the tunneled connection to the VPN server Data fail-over procedure.

The non-transitory computer readable medium is disclosed, wherein the User Device connects to VPN server Data Alternative by: a. sending, from the API, through the tunneled connection to the VPN server Meta, to the user device, pursuant to the request provided by the user device, at least a hostname or an IP Address for a VPN server Data and a VPN server Meta; b. establishing, from the User Device, a tunneled connection to the VPN server Data Alternative; c. updating, at the user device, a routing table of an Operating system of the User Device with the Second Third route pointing toward the tunneled connection to the VPN server Data Alternative; d. directing, the traffic from the User Device according to the Second route; and e. receiving, at the VPN server Data Alternative, the traffic directed from the User Device according to the Second route.

The non-transitory computer readable medium, wherein the User Device is instructed by the VPN Service Provider Infrastructure to connect to VPN server Data Alternative by: a. signaling, by the VPN Service Provider Infrastructure (SPI), the User Device to initiate the tunneled connection to the VPN server Data Data connectivity fail-over procedure; b. obtaining, by the User Device from the API, through the Meta tunnelled connection, at least one of a hostname or an IP address of the VPN server Data alternative in the form of the hostname or the IP address; b. sending, from the API, through the tunneled connection to the VPN server Meta, to the user device, pursuant to the request provided by the user device, at least a hostname or an IP Address for a VPN server Data Alterative;

c. establishing, by the User Device, a tunneled connection to the VPN server Data Alternative; d. updating the routing table of the Operating system within the User Device with the Second route directed toward the tunneled connection to the VPN server Data Alternative; e. terminating, at the User Device, the tunneled connection to VPN server Data; f. directing the traffic, at the User Device, according to the Second route; and g. receiving, at the VPN server Data Alternative, the traffic directed within the User Device according to the Second route.

The non-transitory computer readable medium, wherein the User Device is performing a connectivity test by: sending a packet of data to a target on the Internet through a tunneled connection to a VPN server Data; registering the response from the target on the Internet to the sent packet of data, and measuring the time taken to obtain the response.

The non-transitory computer readable medium is disclosed, wherein the User Device is performing a connectivity test by: sending a packet of data to a target on the VPN server Meta through a tunneled connection to a VPN server Meta; registering the response from the target within the VPN server Meta to the sent packet of data, and measuring the time taken to obtain the response.

Although several embodiments have been described, one of ordinary skill in the art will appreciate that various modifications and changes can be made without departing from the scope of the embodiments detailed herein. Accordingly, the specification and figures are to be regarded in an illustrative rather than a restrictive sense, and all such modifications are intended to be included within the scope of the present teachings. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover, in this document, relational terms such as first and second, and the like may be used solely to distinguish one entity or action from another entity or action without necessarily requiring or implying any actual such relationship or order between such entities or actions. The terms "comprises", "comprising", "has", "having", "includes", "including", "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a", "has . . . a", 'includes . . . a", "contains . . . a" does not, without additional constraints, preclude the existence of additional identical elements in the process, method, article, and/or apparatus that comprises, has, includes, and/or contains the element. The terms "a" and "an" are defined as one or more unless explicitly stated otherwise herein. The terms "approximately", "about" or any other version thereof, are defined as being close to as understood by one of ordinary skill in the art. A device or structure that is "configured" in a certain way is configured in at least that way, but may also be configured in ways that are not listed. For the indication of elements, a singular or plural form can be used, but it does not limit the scope of the disclosure and the same teaching can apply to multiple objects, even if in the current application an object is referred to in its singular form.

It will be appreciated that some embodiments describe the use of one or more generic or specialized databases (such as "User DB", or similar), that contains a collection of information that is organized so that it can be easily accessed, managed and updated. Computer databases typically contain aggregations of data records or files, in the current case, databases usually store different information and statistics about the VPN servers, their attributes e.g. current status, workload, number of concurrent sessions or network capacity. Databases are structured to facilitate the storage, retrieval, modification, and deletion of data in conjunction with various data-processing operations.

The embodiments detailed herein are provided to allow the reader to quickly ascertain the nature of the technical disclosure. It is submitted with the understanding that it will not be used to interpret or limit the scope or meaning of the claims. In addition, in the foregoing Detailed Description, it is demonstrated that multiple features are grouped together in various embodiments for the purpose of streamlining the disclosure. This method of disclosure is not to be interpreted as reflecting an intention that the chimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately chimed subject matter.

The invention claimed is:

1. A method for creating a multi-path virtual private network (VPN) connection, the method comprising:
    authenticating, by an application programming interface (API) within a VPN Service Provider Infrastructure (SPI), a user device communicably coupled to the VPN SPI via a network, wherein the user device is remote to the VPN SPI;
    sending, from the API to the user device, pursuant to the request from the user device, at least a hostname or an IP address for at least one VPN data server and at least one VPN meta server,
    wherein a tunneled connection is established between the user device and one of the at least one VPN data server, wherein the VPN data server configured to send data received from the user device to a target, wherein the target is remote to the user device and the VPN data server,
    wherein a tunneled connection is established between the user device and one of the at least one VPN meta server, wherein the VPN meta server configured to block data received from the user device from leaving the VPN meta server;
    receiving, at the VPN data server from the user device, a first data packet;
    sending, from the VPN data server, via the network, the first data packet to the target;
    receiving, at the VPN meta server from the user device, a notification of a negative outcome indicating a loss of connectivity between the user device and the VPN data server;
    receiving, at the VPN meta server from the user device, the first data packet or a second data packet different from the first data packet; and
    dropping, at the VPN meta server, the first data packet or the second data packet.

2. The method of claim 1, wherein the VPN data server responds to a periodic check request from the user device to check the tunneled connection between the user device and the VPN data server.

3. The method of claim 1, wherein the VPN meta server responds to a periodic check request from the user device to check the tunneled connection between the user device and the VPN meta server.

4. The method of claim 1, wherein the VPN SPI periodically checks at least one of the VPN data server or the VPN meta server for failure.

5. The method of claim 1, wherein at least one the at least one VPN data server comprises a plurality VPN data server, or the at least one VPN meta server comprises a plurality VPN meta server.

6. The method of claim 5, further comprising:
    sending, from the at least one VPN meta server to the user device, an IP address of an alternative VPN data server from the plurality of VPN data server, wherein the user device establishes a tunneled connection to the alternative VPN data server;
    receiving, at the alternative VPN data server, from the user device, a third data packet; and
    sending the third data packet, from the alternative VPN data server, via the network, to the target.

7. The method of claim 5, further comprising:
    identifying an alternative VPN meta server from the plurality of VPN meta server; and
    sending an IP address of the alternative VPN meta server to the user device, wherein the user device establishes a tunneled connection to the alternative VPN meta server.

8. The method of claim 1, wherein upon detection of failure of the VPN data server, an API app of the user device blocks sending any data packet to the Internet.

9. The method of claim 1, wherein access to the VPN data server requires authorization of the user device by the VPN SPI.

10. The method of claim 9, wherein access to the VPN meta server does not require an authorization of the user device by the VPN SPI.

11. A non-transitory computer readable medium for creating a multi-path virtual private network (VPN) connection, the medium comprising computer executable instructions that, when executed by a processor, perform a method comprising:
    authenticating, by an application programming interface (API) within a VPN Service Provider Infrastructure (SPI), a user device communicably coupled to the VPN SPI via a network, wherein the user device is remote to the VPN SPI;
    sending, from the API to the user device, pursuant to the request from the user device, at least a hostname or an IP address for at least one VPN data server and at least one VPN meta server,
    wherein a tunneled connection is established between the user device and one of the at least one VPN data server, wherein the VPN data server configured to send data received from the user device to a target, wherein the target is remote to the user device and the VPN data server,
    wherein a tunneled connection is established between the user device and one of the at least one VPN meta server, wherein the VPN meta server configured to block data received from the user device from leaving the VPN meta server;
    receiving, at the VPN data server from the user device, a first data packet;
    sending, from the VPN data server, via the network, the first data packet to the target;
    receiving, at the VPN meta server from the user device, a notification of a negative outcome indicating a loss of connectivity between the user device and the VPN data server;
    receiving, at the VPN meta server from the user device, the first data packet or a second data packet different from the first data packet; and
    dropping, at the VPN meta server, the first data packet or the second data packet.

12. An apparatus for creating a multi-path virtual private network (VPN) connection, the apparatus comprising:
    at least one processor; and
    a memory comprising computer-executable instructions, which when executed by the at least processor, perform a method comprising:
        authenticating, by an application programming interface (API) within a VPN Service Provider Infrastructure (SPI), a user device communicably coupled to the VPN SPI via a network, wherein the user device is remote to the VPN SPI,
        sending, from the API to the user device, pursuant to the request from the user device, at least a hostname or an IP address for at least one VPN data server and at least one VPN meta server, wherein a tunneled connection is established between the user device and one of the at least one VPN data server, wherein the VPN data server configured to send data received from the user device to a target, wherein the target is remote to the user device and the VPN data server, wherein a tunneled connection is established between the user device and one of the at least one VPN meta server, wherein the VPN meta server configured to block data received from the user device from leaving the VPN meta server, receiving, at the VPN data server from the user device, a first data packet, sending, from the VPN data server, via the network, the first data packet to the target, receiving, at the VPN meta server from the user device, a notification of a negative outcome indicating a loss of connectivity between the user device and the VPN data server, receiving, at the VPN meta server from the user device, the first data packet or a second data packet different from the first data packet, and dropping, at the VPN meta server, the first data packet or the second data packet.

13. The apparatus of claim 12, wherein the VPN data server responds to a periodic check request from the user device to check the tunneled connection between the user device and the VPN data server.

14. The apparatus of claim 12, wherein the VPN meta server responds to a periodic check request from the user device to check the tunneled connection between the user device and the VPN meta server.

15. The apparatus of claim 12, wherein the VPN SPI periodically checks at least one of the VPN data server or the VPN meta server for failure.

16. The apparatus of claim 12, wherein at least one the at least one VPN data server comprises a plurality VPN data server, or the at least one VPN meta server comprises a plurality VPN meta server.

17. The apparatus of claim 16, further comprising:
sending, from the at least one VPN meta server to the user device, an IP address of an alternative VPN data server from the plurality of VPN data server, wherein the user device establishes a tunneled connection to the alternative VPN data server;
receiving, at the alternative VPN data server, from the user device, a third data packet; and
sending the third data packet, from the alternative VPN data server, via the network, to the target.

18. The apparatus of claim 16, further comprising:
identifying an alternative VPN meta server from the plurality of VPN meta server; and
sending an IP address of the alternative VPN meta server to the user device, wherein the user device establishes a tunneled connection to the alternative VPN meta server.

19. The apparatus of claim 12, wherein upon detection of failure of the VPN data server, an API app of the user device blocks sending any data packet to the Internet.

20. The apparatus of claim 12, wherein access to the VPN data server requires authorization of the user device by the VPN SPI.

21. The apparatus of claim 20, wherein access to the VPN meta server does not require an authorization of the user device by the VPN SPI.

* * * * *